United States Patent
Sugiyama et al.

(10) Patent No.: US 12,275,843 B2
(45) Date of Patent: Apr. 15, 2025

(54) LIQUID CRYSTAL POLYESTER RESIN COMPOSITION AND MOLDED OBJECT

(71) Applicant: SUMITOMO CHEMICAL COMPANY, LIMITED, Tokyo (JP)

(72) Inventors: Takayuki Sugiyama, Tsukuba (JP); Tasuku Tamura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 595 days.

(21) Appl. No.: 17/633,441

(22) PCT Filed: Apr. 16, 2020

(86) PCT No.: PCT/JP2020/016723
§ 371 (c)(1),
(2) Date: Feb. 7, 2022

(87) PCT Pub. No.: WO2021/029110
PCT Pub. Date: Feb. 18, 2021

(65) Prior Publication Data
US 2022/0282086 A1    Sep. 8, 2022

(30) Foreign Application Priority Data

Aug. 9, 2019 (JP) ................................ 2019-148159
Dec. 24, 2019 (JP) ................................ 2019-233463

(51) Int. Cl.
C08L 67/04    (2006.01)

(52) U.S. Cl.
CPC ......... *C08L 67/04* (2013.01); *C08L 2205/025* (2013.01); *C08L 2205/12* (2013.01)

(58) Field of Classification Search
CPC .. B29B 7/726; B29B 7/90; B29B 9/12; B29B 9/14; B29C 48/022; B29K 2067/00; B29K 2105/0079; C08J 2367/00; C08J 5/042; C08J 5/08; C08K 3/04; C08K 5/098; C08K 7/14; C08L 2205/025; C08L 2205/12; C08L 67/00; C08L 67/04
See application file for complete search history.

(56) References Cited

U.S. PATENT DOCUMENTS

| | | | |
|---|---|---|---|
| 4,731,432 A | 3/1988 | Portugall | |
| 5,976,406 A | 11/1999 | Negano et al. | |
| 2003/0047712 A1 | 3/2003 | Maeda et al. | |
| 2003/0168634 A1 | 9/2003 | Yamauchi et al. | |
| 2007/0200094 A1 | 8/2007 | Hosoda et al. | |
| 2010/0230637 A1 | 9/2010 | Iwase et al. | |
| 2011/0114884 A1 | 5/2011 | Fukuhara et al. | |
| 2012/0025421 A1 | 2/2012 | Fukuhara et al. | |
| 2012/0153224 A1 | 6/2012 | Yonezawa et al. | |
| 2012/0235090 A1 | 9/2012 | Maeda et al. | |
| 2018/0346681 A1 | 12/2018 | Jang et al. | |
| 2018/0362848 A1 | 12/2018 | Kim et al. | |
| 2019/0191923 A1 | 6/2019 | Saito | |
| 2019/0233582 A1 | 8/2019 | Tsuchiya et al. | |
| 2020/0115546 A1 | 4/2020 | Hara | |
| 2020/0362099 A1 | 11/2020 | Hara et al. | |
| 2020/0362246 A1 | 11/2020 | Hara et al. | |

FOREIGN PATENT DOCUMENTS

| | | |
|---|---|---|
| CN | 101845203 A | 9/2010 |
| CN | 101967270 A | 2/2011 |
| CN | 102344651 A | 2/2012 |
| CN | 102585184 A | 7/2012 |
| CN | 106380790 A | 2/2017 |
| CN | 108291347 A | 7/2018 |
| CN | 109561792 A | 4/2019 |
| CN | 110079058 A | 8/2019 |
| DE | 3338805 A1 | 5/1985 |
| JP | H08-325441 A | 12/1996 |
| JP | 10-077350 A | 3/1998 |
| JP | 10-219085 A | 8/1998 |
| JP | 2007-238936 A | 9/2007 |
| JP | 2008-001848 A | 1/2008 |
| JP | 2009-108179 A | 5/2009 |
| JP | 2009-221427 A | 10/2009 |
| JP | 2011-122148 A | 6/2011 |
| JP | 2011-190461 A | 9/2011 |
| JP | 2012-192678 A | 10/2012 |
| JP | 6643516 B1 | 2/2020 |
| JP | 6675028 B1 | 4/2020 |
| JP | 6694998 B1 | 5/2020 |
| TW | 201906924 A | 2/2019 |

OTHER PUBLICATIONS

Extended European Search Report issued in corresponding European Patent Application No. 20851951.2-1107, dated Jun. 19, 2023.
Lu Yunli, et al., "Study on toughening modification of glass fiber reinforced high temperature liquid crystal polyester" Research and Development, 2017 vol. 43.
International Search Report issued in corresponding International Patent Application No. PCT/JP2020/016723, dated Jun. 30, 2020, with English translation. 5 pages.

*Primary Examiner* — Ana L. Woodward
(74) *Attorney, Agent, or Firm* — Rimon P.C.

(57) ABSTRACT

A liquid crystal polyester resin composition includes resin pellets including a first liquid crystal polyester resin and a fibrous filler, a second liquid crystal polyester resin, and a metal salt of higher fatty acid, in which the second liquid crystal polyester resin has a lower flow starting temperature than the resin pellets, flow starting temperatures of the resin pellets and the second liquid crystal polyester resin are both 250° C. or higher, and a difference in the flow starting temperatures between the resin pellets and the second liquid crystal polyester resin is more than 10° C.

6 Claims, 1 Drawing Sheet

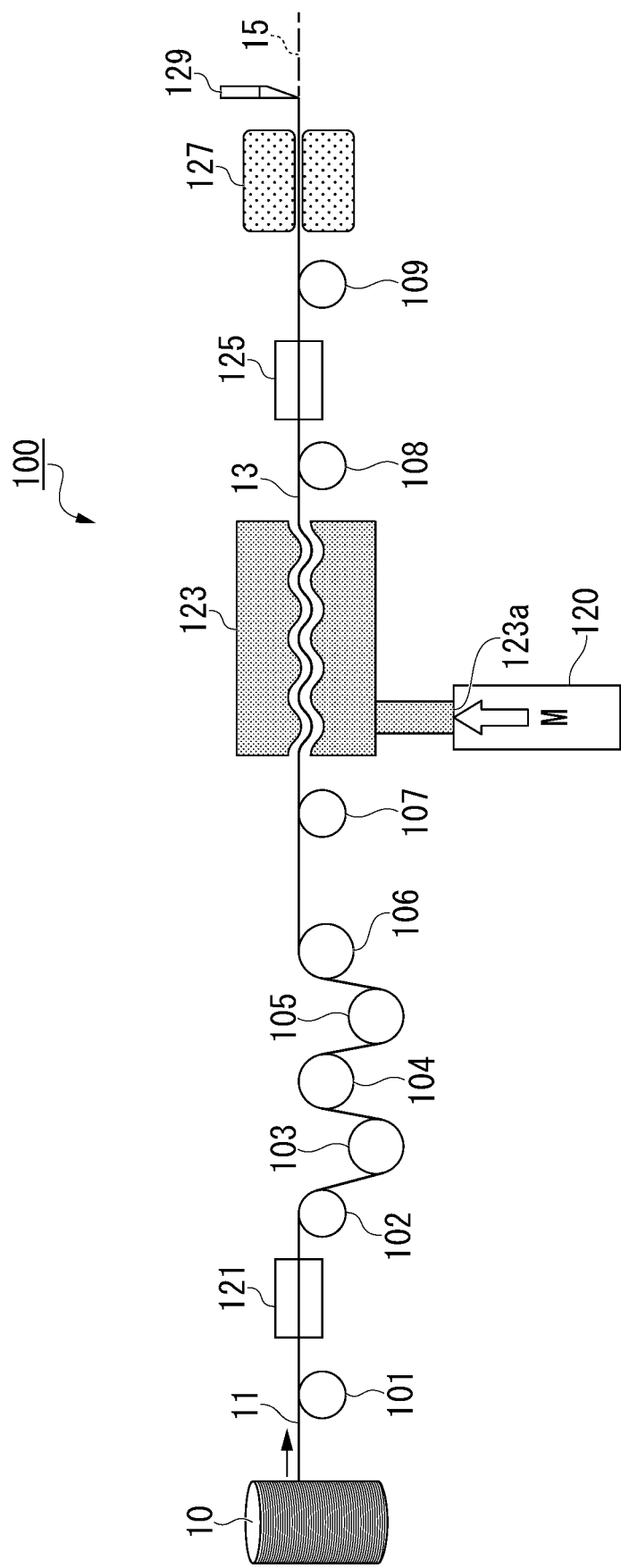

LIQUID CRYSTAL POLYESTER RESIN COMPOSITION AND MOLDED OBJECT

CROSS REFERENCE TO RELATED APPLICATIONS

This application is the U.S. National Phase under 35 U.S.C. § 371 of International Application No. PCT/JP2020/016723, filed on Apr. 16, 2020, which claims the benefit of Japanese Application No. 2019-148159, filed on Aug. 9, 2019, and Japanese Application No. 2019-233463, filed on Dec. 24, 2019, the entire contents of each are hereby incorporated by reference.

TECHNICAL FIELD

The present invention relates to a liquid crystal polyester resin composition and a molded article produced using the liquid crystal polyester resin composition.

BACKGROUND ART

Liquid crystal polyester resins are known to have high flowability, heat resistance, and dimensional accuracy. Liquid crystal polyester resins are usually not used alone, but are used as liquid crystal polyester resin compositions containing fillers in order to satisfy the characteristics (for example, bending characteristics and impact resistance) demanded in various applications. It is known that molded articles produced from such liquid crystal polyester resin compositions have high strength while being lightweight.

In recent years, in the field of transportation equipment including automobiles and aircraft, the weight reduction of parts is being pursued for the purpose of improving fuel efficiency. In order to reduce the weight of parts, the use of resin materials instead of the current metal materials for the materials of each part is being considered. For example, using a liquid crystal polyester resin as a molding material for frame members, suspension members, impact absorbing members, and the like for automobiles makes it possible to obtain lightweight automobiles compared to the current products.

However, there is a problem in that molded articles obtained from the liquid crystal polyester resin compositions described above have inferior mechanical properties to molded articles obtained from metal materials.

In the related art, in order to improve the strength of molding materials such as thermoplastic resin compositions, a method for mixing fibers into a thermoplastic resin as a filler was proposed (for example, refer to Patent Document 1).

In addition, in injection-molded articles using liquid crystal polyester resin pellets, there are cases where continuous molding is carried out for a long period of time under injection-molding conditions in which the molding cycle is shortened to improve productivity. In such continuous molding of liquid crystal polyester resins, there is also a demand for high stability of the metering time (also known as plasticization time) during injection molding. When the metering time during molding varies, the characteristics of the molded articles are influenced.

CITATION LIST

[Patent Document]
[Patent Document 1]
Japanese Unexamined Patent Application, First Publication No. H10-77350

SUMMARY OF INVENTION

Technical Problem

There is a demand for further weight reduction in the molding of molded articles that account for a large proportion of the weight of vehicle bodies, such as frame members, suspension members, and impact absorbing members for automobiles.

As the weight of the molded articles is further reduced, securing the strength of the molded articles becomes a problem. For example, in impact absorbing members for automobiles, strength against collision load and the like are necessary for safety in cars during collisions.

However, molded articles obtained from molding materials of the related art containing a thermoplastic resin and fibers are not able to obtain the necessary molded article strength against collision loads.

The present invention was made in consideration of the above circumstances and has an object of providing a liquid crystal polyester resin composition able to further improve molded article strength (in particular, impact strength) and a molded article produced using the liquid crystal polyester resin composition.

Solution to Problem

In order to solve the above problem, the present invention adopted the following configurations.

[1] A liquid crystal polyester resin composition including resin pellets including a first liquid crystal polyester resin and a fibrous filler, a second liquid crystal polyester resin, and a metal salt of higher fatty acid, in which the second liquid crystal polyester resin has a lower flow starting temperature than the resin pellets, flow starting temperatures of the resin pellets and the second liquid crystal polyester resin are both 250° C. or higher, and a difference in the flow starting temperatures between the resin pellets and the second liquid crystal polyester resin is more than 10° C.

[2] The liquid crystal polyester resin composition according to [1], in which a melting point of the metal salt of higher fatty acid is 230° C. or lower.

[3] The liquid crystal polyester resin composition according to [1] or [2], in which a content of the fibrous filler is 20 parts by mass to 60 parts by mass with respect to a total amount (100 parts by mass) of the resin pellets and the second liquid crystal polyester resin.

[4] The liquid crystal polyester resin composition according to any one of [1] to [3], in which a content of the metal salt of higher fatty acid is 0.02 parts by mass to 0.15 parts by mass with respect to a total amount (100 parts by mass) of the resin pellets and the second liquid crystal polyester resin.

[5] The liquid crystal polyester resin composition according to any one of [1] to [4], in which the fibrous filler is glass fibers or carbon fibers.

[6] The liquid crystal polyester resin composition according to any one of [1] to [5], in which a length weighted average fiber length of the fibrous filler is 5 mm to 20 mm.

[7] A molded article produced using the liquid crystal polyester resin composition according to any one of [1] to [6].

Advantageous Effects of Invention

According to the present invention, it is possible to provide a liquid crystal polyester resin composition able to further improve the strength of a molded article.

In addition, according to the present invention, it is possible to provide a molded article for which the molded article strength is further improved.

BRIEF DESCRIPTION OF DRAWINGS

FIG. 1 is a schematic diagram showing an example of a resin pellet manufacturing apparatus.

DESCRIPTION OF EMBODIMENTS (Liquid Crystal Polyester Resin Composition)

The liquid crystal polyester resin composition of the present embodiment contains resin pellets including a first liquid crystal polyester resin and a fibrous filler, a second liquid crystal polyester resin, and a metal salt of higher fatty acid.

Here, the form of the liquid crystal polyester resin composition is not particularly limited and may be any of a mixture of resin pellets, a second liquid crystal polyester resin in powder form or pellet form, and a metal salt of higher fatty acid; a pellet-form product or a mixture in which the resin pellets are coated with the second liquid crystal polyester resin and further externally coated with the metal salt of higher fatty acid; an injection-molded article in which the mixture or the pellet-form product is injection-molded, and the like.

<Resin Pellets Including First Liquid Crystal Polyester Resin and Fibrous Filler>

The resin pellets including the first liquid crystal polyester resin and the fibrous filler in the present embodiment (also referred to below as "resin pellets") are, for example, resin pellets in which a melt obtained by melting and kneading the first liquid crystal polyester resin and other components as necessary is impregnated in the fibrous filler and pelletized, in which the fibrous filler is in a state of being hardened by the first liquid crystal polyester resin.

The flow starting temperature of the resin pellets in the present embodiment is 250° C. or higher, and preferably 260° C. or higher.

In addition, the flow starting temperature of the resin pellets in the present embodiment is preferably 400° C. or lower and more preferably 380° C. or lower.

For example, the flow starting temperature of the resin pellets in the present embodiment is preferably 250° C. or higher and 400° C. or lower, more preferably 260° C. or higher and 400° C. or lower, and even more preferably 260° C. or higher and 380° C. or lower.

The higher the flow starting temperature of the resin pellets, the higher the heat resistance and strength of the molded article produced using the liquid crystal polyester resin composition containing the resin pellets tend to be.

On the other hand, when the flow starting temperature of the resin pellets is more than 400° C., the melting temperature and melting viscosity of the resin pellets tend to increase. Therefore, the temperature necessary for molding the liquid crystal polyester resin composition containing the resin pellets tends to increase.

In the present specification, the flow starting temperature (the flow starting temperature of the resin pellets or the liquid crystal polyester resin) is also referred to as the flow temperature or flowing temperature, and is a temperature which is a guide for the molecular weight of the liquid crystal polyester resin (liquid crystal polyester resin included in the resin pellets) (Naoyuki Koide, "Liquid Crystal Polymer-Synthesis, Molding, and Applications" CMC Corporation, Jun. 5, 1987, refer to page 95).

As a method for measuring the flow starting temperature, specifically, the flow starting temperature is the temperature at which the viscosity is 4800 Pa·s (48000 poise) when resin pellets or a liquid crystal polyester resin are melted using a capillary rheometer while the temperature is raised at a rate of 4° C./min under a load of 9.8 MPa (100 kg/cm$^2$) and extruded from a nozzle with an inner diameter of 1 mm and a length of 10 mm.

Using a ball mill type freeze-grinder (JFC-1500, manufactured by Japan Analytical Industry), the resin pellets are freeze-ground before the measurement under the following conditions and the flow starting temperature is measured.

Pellet introduction amount: 5 g
Pre-freezing time: 10 min
Freeze-grinding time: 10 min <<First Liquid Crystal Polyester Resin>>

The first liquid crystal polyester resin included in the resin pellets in the present embodiment may be any polyester resin which exhibits liquid-crystal properties in a molten state and is not particularly limited, but the resin preferably melts at a temperature of 400° C. or lower. The first liquid crystal polyester resin in the present embodiment may be a liquid crystal polyester amide, a liquid crystal polyester ether, a liquid crystal polyester carbonate, a liquid crystal polyester imide, or the like.

The first liquid crystal polyester resin in the present embodiment is preferably a fully aromatic liquid crystal polyester formed using only aromatic compounds as raw material monomers.

Typical examples of the first liquid crystal polyester resin in the present embodiment include resins formed by polymerization (polycondensation) of an aromatic hydroxycarboxylic acid, an aromatic dicarboxylic acid, and at least one compound selected from the group consisting of an aromatic diol, an aromatic hydroxyamine, and an aromatic diamine; resins formed by polymerization of a plurality of types of aromatic hydroxycarboxylic acids; resins formed by polymerization of an aromatic dicarboxylic acid and at least one compound selected from the group consisting of an aromatic diol, an aromatic hydroxyamine, and an aromatic diamine; and resins formed by polymerization of a polyester such as polyethylene terephthalate and an aromatic hydroxycarboxylic acid.

Here, aromatic hydroxycarboxylic acids, aromatic dicarboxylic acids, aromatic diols, aromatic hydroxyamines, and aromatic diamines may each independently be partially or fully substituted, and polymerizable derivatives thereof may be used.

Examples of polymerizable derivatives of compounds having a carboxyl group, such as aromatic hydroxycarboxylic acids and aromatic dicarboxylic acids, include derivatives (esters) formed by converting a carboxyl group to an alkoxycarbonyl group or an aryloxycarbonyl group; derivatives (acid halides) formed by converting a carboxyl group to a haloformyl group; derivatives (acid anhydrides) formed by converting a carboxyl group to an acyloxycarbonyl group, and the like.

Examples of polymerizable derivatives of compounds having a hydroxyl group, such as aromatic hydroxycarboxylic acids, aromatic diols, and aromatic hydroxyamines, include derivatives (acylates) formed by acylating a hydroxyl group for conversion to an acyloxyl group, and the like.

Examples of polymerizable derivatives of compounds having an amino group, such as aromatic hydroxyamines and aromatic diamines, include derivatives (acylates) formed by acylating an amino group for conversion to an acylamino group, and the like.

The first liquid crystal polyester resin in the present embodiment preferably has a repeating unit represented by Formula (1) (also referred to below as "repeating unit (1)"), and more preferably has the repeating unit (1), a repeating unit represented by Formula (2) (also referred to below as "repeating unit (2)"), and a repeating unit represented by Formula (3) (also referred to below as "repeating unit (3)").

—O—Ar¹—CO— (1)

—CO—Ar²—CO— (2)

—X—Ar³—Y— (3)

[In the formula, Ar¹ represents a phenylene group, a naphthylene group, or a biphenylylene group. Ar² and Ar³ each independently represent a phenylene group, naphthylene group, biphenylylene group, or a group represented by Formula (4). X and Y each independently represent an oxygen atom or an imino group (—NH—). The hydrogen atoms in the groups represented by Ar¹, Ar², or Ar³ may each independently be substituted with a halogen atom, an alkyl group, or an aryl group.]

—Ar⁴—Z—Ar⁵— (4)

[In the formula, Ar⁴ and Ar⁵ each independently represent a phenylene group or a naphthylene group. Z represents an oxygen atom, a sulfur atom, a carbonyl group, a sulfonyl group, or an alkylidene group.]

Examples of halogen atoms able to be substituted with one or more hydrogen atoms in the group represented by Ar¹, Ar², or Ar³ include fluorine atoms, chlorine atoms, bromine atoms, and iodine atoms.

Examples of alkyl groups able to be substituted with one or more hydrogen atoms in the groups represented by Ar¹, Ar², or Ar³ include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, an n-decyl group, and the like and the number of carbon atoms thereof is preferably 1 to 10.

Examples of aryl groups able to be substituted with one or more hydrogen atoms in the groups represented by Ar¹, Ar², or Ar³ include a phenyl group, an o-tolyl group, an m-tolyl group, a p-tolyl group, a 1-naphthyl group, a 2-naphthyl group, and the like and the number of carbon atoms thereof is preferably 6 to 20.

In a case where the hydrogen atoms in the groups represented by Ar¹, Ar², or Ar³ are substituted with the groups described above, the number of substitutions is preferably one or two and more preferably one.

Examples of the alkylidene group in Z in Formula (4) include a methylene group, an ethylidene group, an isopropylidene group, an n-butylidene group, a 2-ethylhexylidene group, and the like and the number of carbon atoms thereof is preferably 1 to 10.

The repeating unit (1) is a repeating unit derived from a predetermined aromatic hydroxycarboxylic acid. As the repeating unit (1), repeating units in which Ar¹ is a 1,4-phenylene group (a repeating unit derived from p-hydroxybenzoic acid) and repeating units in which Ar¹ is a 2,6-naphthylene group (a repeating unit derived from 6-hydroxy-2-naphthoic acid) are preferable.

In the present specification, the term "derived from" means that the chemical structure of the functional groups contributing to the polymerization of the raw material monomer is changed due to the polymerization of the monomer and that no other structural changes occur.

The repeating unit (2) is a repeating unit derived from a predetermined aromatic dicarboxylic acid. As the repeating unit (2), repeating units in which Ar² is a 1,4-phenylene group (a repeating unit derived from terephthalic acid), repeating units in which Ar² is a 1,3-phenylene group (a repeating unit derived from isophthalic acid), repeating units in which Ar² is a 2,6-naphthylene group (a repeating unit derived from 2,6-naphthalene dicarboxylic acid), and repeating units in which Ar² is a diphenyl ether-4,4'-diyl group (a repeating unit derived from diphenyl ether-4,4'-dicarboxylic acid) are preferable.

The repeating unit (3) is a repeating unit derived from a predetermined aromatic diol, aromatic hydroxylamine, or aromatic diamine. As the repeating unit (3), repeating units in which Ar³ is a 1,4-phenylene group (a repeating unit derived from hydroquinone, p-aminophenol, or p-phenylenediamine) and repeating units in which Ar³ is a 4,4'-biphenylylene group (a repeating unit derived from 4,4'-dihydroxybiphenyl, 4-amino-4'-hydroxybiphenyl, or 4,4'-diaminobiphenyl) are preferable.

The content of the repeating unit (1) is preferably 30 mol % or more with respect to the total amount of all the repeating units (a value obtained by determining the amount (moles) equivalent to the substance amount of each repeating unit by dividing the mass of each repeating unit forming the liquid crystal polyester resin by the formula amount of each repeating unit, and then taking the results in total), more preferably 30 mol % or more and 80 mol % or less, even more preferably 40 mol % or more and 70 mol % or less, and particularly preferably 45 mol % or more and 65 mol % or less.

The content of the repeating unit (2) is preferably 35 mol % or less with respect to the total amount of all the repeating units, more preferably 10 mol % or more and 35 mol % or less, even more preferably 15 mol % or more and 30 mol % or less, and particularly preferably 17.5 mol % or more and 27.5 mol % or less.

The content of the repeating unit (3) is preferably 35 mol % or less with respect to the total amount of all the repeating units, more preferably 10 mol % or more and 35 mol % or less, even more preferably 15 mol % or more and 30 mol % or less, and particularly preferably 17.5 mol % or more and 27.5 mol % or less.

In a case where the first liquid crystal polyester resin in the present embodiment is formed of the repeating units (1) to (3) described above, the sum of the content of the repeating unit (1) of the liquid crystal polyester, the content of the repeating unit (2) of the liquid crystal polyester, and the content of the repeating unit (3) of the liquid crystal polyester is not more than 100 mol %.

The higher the content of the repeating unit (1), the easier it is to improve the melt flowability, heat resistance, strength, and rigidity, but when the content is excessively high, the melting temperature and melting viscosity increase easily and the temperature necessary for molding increases easily.

The ratio of the content of the repeating unit (2) to the content of the repeating unit (3), expressed as [content of repeating unit (2)]/[content of repeating unit (3)](mole/mole), is preferably 0.9/1 to 1/0.9, more preferably 0.95/1 to 1/0.95, and even more preferably 0.98/1 to 1/0.98.

The first liquid crystal polyester resin in the present embodiment may each independently have two or more of the repeating units (1) to (3). In addition, the first liquid crystal polyester resin may have repeating units other than the repeating units (1) to (3), but the content of the repeating units is preferably 10 mol % or less with respect to the total amount of all the repeating units, and more preferably 5 mol % or less.

For the first liquid crystal polyester resin in the present embodiment, having a repeating unit in which X and Y are each oxygen atoms as the repeating unit (3), that is, having a repeating unit derived from a predetermined aromatic diol, is preferable since the melting viscosity is easily lowered, and having only a repeating unit in which X and Y are each oxygen atoms as the repeating unit (3) is more preferable.

The first liquid crystal polyester resin in the present embodiment is preferably manufactured by melt polymerization of raw material monomers corresponding to the repeating units forming the resin and solid phase polymerization of the obtained polymer. Due to this, it is possible to manufacture high-molecular-weight liquid crystal polyester resins with high heat resistance, strength, and rigidity with a good operation.

The melt polymerization may be performed in the presence of a catalyst. Examples of this catalyst include metal compounds such as magnesium acetate, first tin acetate, tetrabutyl titanate, lead acetate, sodium acetate, potassium acetate, and antimony trioxide, and nitrogen-containing heterocyclic compounds such as 4-(dimethylamino)pyridine and 1-methylimidazole, and nitrogen-containing heterocyclic compounds are preferably used.

The first liquid crystal polyester resin in the present embodiment may be used alone as one type or in a combination of two or more types, but it is preferable to use a combination of two or more types since it is possible to easily adjust the flow starting temperature.

The content of the first liquid crystal polyester resin in the present embodiment is preferably 10 parts by mass or more with respect to the total amount (100 parts by mass) of the resin pellets, more preferably 20 parts by mass or more, and even more preferably 25 parts by mass or more.

In addition, the content of the first liquid crystal polyester resin in the present embodiment is preferably 80 parts by mass or less with respect to the total amount (100 parts by mass) of the resin pellets, more preferably 75 parts by mass or less, and even more preferably 70 parts by mass or less.

For example, the content of the first liquid crystal polyester resin in the present embodiment is preferably 10 parts by mass to 80 parts by mass with respect to the total amount (100 parts by mass) of the resin pellets, more preferably 20 parts by mass to 75 parts by mass, and even more preferably 25 parts by mass to 70 parts by mass.

The content of the first liquid crystal polyester resin in the present embodiment is preferably 5 parts by mass or more with respect to the total amount (100 parts by mass) of the liquid crystal polyester resin composition in the present embodiment, more preferably 10 parts by mass or more, and even more preferably 15 parts by mass or more.

In addition, the content of the first liquid crystal polyester resin in the present embodiment is preferably 50 parts by mass or less with respect to the total amount (100 parts by mass) of the liquid crystal polyester resin composition in the present embodiment, more preferably 40 parts by mass or less, and even more preferably 30 parts by mass or less.

For example, the content of the first liquid crystal polyester resin in the present embodiment is preferably 5 parts by mass to 50 parts by mass with respect to the total amount (100 parts by mass) of the liquid crystal polyester resin composition in the present embodiment, more preferably 10 parts by mass to 40 parts by mass, and even more preferably 15 parts by mass to 30 parts by mass.

<<Fibrous Filler>>

The fibrous filler in the present embodiment may be a fibrous inorganic filler or may be a fibrous organic filler.

Examples of fibrous inorganic fillers include glass fibers; carbon fibers such as PAN-based, pitch-based, rayon-based, phenol-based, and lignin-based carbon fibers; ceramic fibers such as silica fibers, alumina fibers, and silica-alumina fibers; metal fibers such as iron, gold, copper, aluminum, brass, and stainless steel; silicon carbide fibers; boron fibers, and the like. In addition, examples of fibrous inorganic fillers include whiskers such as potassium titanate whiskers, barium titanate whiskers, wollastonite whiskers, aluminum borate whiskers, silicon nitride whiskers, and silicon carbide whiskers.

Examples of fibrous organic fillers include polyester fibers, para- or meta-aramid fibers, PBO fibers, and the like.

As the fibrous filler in the present embodiment, among the above, from the viewpoints of being able to further improve the molded article strength and of easy availability, carbon fibers or glass fibers are preferable.

The type of glass fibers is not particularly limited and it is possible to use any known glass fibers and examples thereof include E-glass (that is, alkali-free glass), C-glass (that is, glass for acid-resistant applications), AR-glass (that is, glass for alkali-resistant applications), S-glass, T-glass, or the like.

Among the above, the glass fibers are preferably E-glass.

The glass fibers may be unprocessed or may be processed.

It is possible to perform processes on the glass fibers with converging agents, silane coupling agents, boron compounds, and the like. Examples of converging agents include aromatic urethane-based converging agents, aliphatic urethane-based converging agents, acrylic converging agents, and the like.

The fibrous filler in the resin pellets in the present embodiment preferably has a length weighted average fiber length of 4 mm or more, more preferably a length weighted average fiber length of 4.5 mm or more, even more preferably a length weighted average fiber length of 5 mm or more, particularly preferably a length weighted average fiber length of 6 mm or more, and most preferably a length weighted average fiber length of 7 mm or more.

On the other hand, the fibrous filler preferably has a length weighted average fiber length of less than 50 mm, more preferably a length weighted average fiber length of 40 mm or less, even more preferably a length weighted average fiber length of 20 mm or less, and particularly preferably a length weighted average fiber length of 15 mm or less.

For example, the length weighted average fiber length of the fibrous filler is preferably 4 mm or more and less than 50 mm, more preferably 4.5 mm or more and 40 mm or less, even more preferably 5 mm or more and 20 mm or less, yet more preferably 5.5 mm or more and 15 mm or less, and particularly preferably 6 mm or more and 15 mm or less.

The length weighted average fiber length of the fibrous filler being the lower limit value or more of the preferable ranges described above further improves the molded article strength. On the other hand, being the upper limit value or less of the preferable ranges described above makes it easier to carry out the molding.

In the present embodiment, the fiber length and length weighted average fiber length of the fibrous filler in the resin pellets are measured by the following procedures.

Procedure (1); 2 g of resin pellets are heated in a muffle furnace to remove the resin content (first liquid crystal polyester resin).

For example, in a case where the fibrous filler is carbon fibers, the heating conditions are set to 500° C. for 3 hours.

In a case where the fibrous filler is glass fibers, the heating conditions are set to 600° C. for 4 hours.

Procedure (2); The resin content is removed from the resin pellets and the result is dispersed in 1000 mL of an aqueous solution containing 0.05% by volume of a surfactant (Micro 90, manufactured by International Products Corporation) to prepare a dispersion solution.

Procedure (3); 100 mL is extracted from the dispersion solution and diluted to 5 times to 20 times with pure water. A part is extracted from the dispersion solution after dilution, the fibrous filler is observed with a microscope (VH-Z25, manufactured by Keyence Corporation, magnification 10 times to 20 times), and 10 images per sample are taken such that the imaged regions do not overlap.

Here, in a case where the fibrous filler is carbon fibers, 50 mL is extracted from the dispersion solution after dilution and filtered under reduced pressure using Kiriyama funnel filter paper (No. 5C) with Φ90 mm diameter and images are taken of the carbon fibers dispersed on the filter paper.

In a case where the fibrous filler is glass fibers, 50 mL is extracted from the dispersion solution after dilution and dispersed in a Petri dish, followed by taking images of the glass fibers dispersed in the Petri dish.

Procedure (4); The lengths of all fibers present in one taken image are measured with the measuring tool of the microscope. Bent fibers are measured by multipoint-to-point measurement and the fibers contacting the edge of the image are not measured. The same operation is performed sequentially on the 10 taken images to measure the fiber length until the total number of measured fibers is more than 500. In a case where the total number of fibers in the 10 taken images is not more than 500, returning to Procedure (3), the dilution ratio with pure water is appropriately adjusted and the images are re-taken to re-measure the fiber length.

Procedure (5); From the fiber length of the fibrous filler measured in Procedure (4), the length weighted average fiber length $l\ m=(\Sigma li^2 \times ni)/(\Sigma li \times ni)$ is determined ($\Sigma ni>500$).

li: Fiber length of fibrous filler
ni: Number of fibrous fillers with fiber length li The fineness of the fibrous filler in the resin pellets in the present embodiment is not particularly limited, but 200 g/1000 m or more is preferable, 500 g/1000 m or more is more preferable, and 800 g/1000 m or more is even more preferable.

In addition, the fineness of the fibrous filler is preferably 3750 g/1000 m or less, more preferably 3200 g/1000 m or less, and even more preferably 2500 g/1000 m or less.

That is, the fineness of the fibrous filler in the resin pellets is preferably 200 g/1000 m or more and 3750 g/1000 m or less, and more preferably 800 g/1000 m or more and 2500 g/1000 m or less.

In the present specification, "fineness" means the thickness of the fibrous filler as a bundle when aligned in one direction (thickness of the fiber bundle).

The number-average fiber diameter of the fibrous filler in the resin pellets is not particularly limited, but is preferably 1 μm to 40 μm and more preferably 3 μm to 35 μm.

In a case where the fibrous filler is carbon fibers, 1 μm to 15 μm is preferable, 3 μm to 10 μm is more preferable, and 4 μm to 9 μm is even more preferable.

In a case where the fibrous filler is glass fibers, 5 μm to 35 μm is preferable, 10 μm to 25 μm is more preferable, and 10 μm to 20 μm is even more preferable.

As the method for measuring the number-average fiber diameter of the fibrous filler in the resin pellets, for example, it is possible to remove the resin content with the same method as in Procedure (1) for the fiber length and length weighted average fiber length of the fibrous filler described above, to observe the obtained fibrous filler under a scanning electron microscope (1000 times), and to adopt the number-average value of the values obtained by measuring the fiber diameter with regard to 500 randomly selected fibrous fillers.

When the number-average fiber diameter of the fibrous filler is the lower limit value or more of the preferable range described above, the fibrous filler is easily dispersed in the resin pellets.

On the other hand, when the number-average fiber diameter is the upper limit value or less of the preferable range described above, strengthening of the molded article by the fibrous filler is performed efficiently. Therefore, it is possible to further improve the molded article strength.

For the resin pellets in the present embodiment, 100 parts by mass of the first liquid crystal polyester resin are preferably impregnated in 80 parts by mass or more of the fibrous filler, 100 parts by mass of the first liquid crystal polyester resin are more preferably impregnated in 120 parts by mass or more of the fibrous filler, and 100 parts by mass of the first liquid crystal polyester resin are even more preferably impregnated in 160 parts by mass or more of the fibrous filler.

In addition, for the resin pellets in the present embodiment, 100 parts by mass of the first liquid crystal polyester resin are preferably impregnated in 250 parts by mass or less of the fibrous filler, 100 parts by mass of the first liquid crystal polyester resin are more preferably impregnated in 240 parts by mass or less of the fibrous filler, and 100 parts by mass of the first liquid crystal polyester resin are even more preferably impregnated in 220 parts by mass or less of the fibrous filler.

For example, for the resin pellets in the present embodiment, 100 parts by mass of the first liquid crystal polyester resin are preferably impregnated in 80 parts by mass to 250 parts by mass of the fibrous filler, 100 parts by mass of the first liquid crystal polyester resin are more preferably impregnated in 120 parts by mass to 240 parts by mass of the fibrous filler, and 100 parts by mass of the first liquid crystal polyester resin are even more preferably impregnated in 160 parts by mass to 220 parts by mass of the fibrous filler.

When the mass ratio of the first liquid crystal polyester resin and the fibrous filler is the lower limit value or more of the preferable range described above, the molded article strength is further improved. On the other hand, when the mass ratio is the upper limit value or less of the preferable range described above, the opening of the fiber bundle and impregnation of the first liquid crystal polyester resin in the fibrous filler is easy.

In the resin composition of the present embodiment, the content of the fibrous filler described above is preferably more than 35 parts by mass with respect to the total amount (100 parts by mass) of the resin pellets and the second liquid crystal polyester resin, more preferably 40 parts by mass or more, and even more preferably 45 parts by mass or more.

In addition, in the resin composition of the present embodiment, the content of the fibrous filler described above is preferably less than 65 parts by mass with respect to the total amount (100 parts by mass) of the resin pellets and the second liquid crystal polyester resin, more preferably 60 parts by mass or less, and even more preferably 55 parts by mass or less.

For example, in the resin composition of the present embodiment, the content of the fibrous filler described above is preferably more than 35 parts by mass and less than 65 parts by mass with respect to the total amount (100 parts by mass) of the resin pellets and the second liquid crystal polyester resin, more preferably 40 parts by mass or more and 60 parts by mass or less, and even more preferably 45 parts by mass or more and 55 parts by mass or less.

When the content of the fibrous filler is the preferable upper limit value or less, the moldability is improved.

When the content of the fibrous filler is the preferable lower limit value or more, it is possible to further improve the molded article strength.

The content of the fibrous filler in the present embodiment is preferably 20 parts by mass or more with respect to the total amount (100 parts by mass) of the liquid crystal polyester resin composition of the present embodiment, more preferably 30 parts by mass or more, and even more preferably 40 parts by mass or more.

In addition, the content of the fibrous filler in the present embodiment is preferably 70 parts by mass or less with respect to the total amount (100 parts by mass) of the liquid crystal polyester resin composition of the present embodiment, more preferably 65 parts by mass or less, and even more preferably 60 parts by mass or less.

For example, the content of the fibrous filler in the present embodiment is preferably 20 parts by mass to 70 parts by mass with respect to the total amount (100 parts by mass) of the liquid crystal polyester resin composition of the present embodiment, more preferably 30 parts by mass to 65 parts by mass, and even more preferably 40 parts by mass to 60 parts by mass.

<Second Liquid Crystal Polyester Resin>

The second liquid crystal polyester resin in the present embodiment is a polyester resin which exhibits liquid-crystal properties in a molten state and has a lower flow starting temperature than the resin pellets described above.

The flow starting temperature of the second liquid crystal polyester resin in the present embodiment is 250° C. or higher and preferably 260° C. or higher.

In addition, the flow starting temperature of the second liquid crystal polyester resin in the present embodiment is preferably 400° C. or lower and more preferably 380° C. or lower.

For example, the flow starting temperature of the second liquid crystal polyester resin in the present embodiment is more preferably 260° C. or higher and 400° C. or lower, and even more preferably 260° C. or higher and 380° C. or lower.

The higher the flow starting temperature of the second liquid crystal polyester resin, the better the heat resistance and strength of the molded article produced using the liquid crystal polyester resin composition containing the second liquid crystal polyester resin tend to be.

On the other hand, when the flow starting temperature of the second liquid crystal polyester resin is more than 400° C., the melting temperature and melting viscosity of the second liquid crystal polyester resin tend to increase. Therefore, the temperature necessary for molding the liquid crystal polyester resin composition containing the second liquid crystal polyester resin tends to increase.

For example, preferably, the flow starting temperature of the resin pellets in the present embodiment is 300° C. or higher and 400° C. or lower and the flow starting temperature of the second liquid crystal polyester resin is 250° C. or higher and lower than 290° C., more preferably, the flow starting temperature of the resin pellets in the present embodiment is 300° C. or higher and 380° C. or lower and the flow starting temperature of the second liquid crystal polyester resin is 260° C. or higher and lower than 290° C., and even more preferably, the flow starting temperature of the resin pellets in the present embodiment is 300° C. or higher and 325° C. or lower and the flow starting temperature of the second liquid crystal polyester resin is 270° C. or higher and lower than 290° C.

In the liquid crystal polyester resin composition of the present embodiment, the difference in the flow starting temperatures between the resin pellets and the second liquid crystal polyester resin (flow starting temperature of the resin pellets—flow starting temperature of the second liquid crystal polyester resin) is more than 10° C., preferably 15° C. or more, more preferably 20° C. or more, even more preferably 25° C. or more, and particularly preferably 28° C. or more.

Due to the difference in the flow starting temperatures between the resin pellets and the second liquid crystal polyester resin being more than 10° C., during the processing process up to the production of the molded article, the resin pellets do not melt easily even at the molding temperature at which the second liquid crystal polyester resin melts sufficiently, thus, it is possible to maintain the fibrous filler included in the resin pellets in a more bundled state and it is possible to improve the molded article strength since the fibrous filler is able to remain long. In addition, when the difference in the flow starting temperature is the preferable value or higher, the effect is further improved.

The upper limit value of the difference in flow starting temperature between the resin pellets and the second liquid crystal polyester resin is not particularly limited and is, for example, 40° C. That is, the difference in the flow starting temperatures between the resin pellets and the second liquid crystal polyester resin is preferably 15° C. or higher and 40° C. or lower, more preferably 20° C. or higher and 40° C. or lower, even more preferably 25° C. or higher and 40° C. or lower, and particularly preferably 28° C. or higher and 40° C. or lower.

Specific examples of the second liquid crystal polyester resin are the same as for the first liquid crystal polyester resin described above and include a liquid crystal polyester resin having the repeating unit (1) and the like.

By appropriately selecting the types of raw material monomers and the content of each repeating unit described in the first liquid crystal polyester resin described above and by adjusting the molecular weight thereof, it is possible to manufacture a second liquid crystal polyester resin having a lower flow starting temperature than the resin pellets described above.

The second liquid crystal polyester resin in the present embodiment may be used alone as one type or in a combination of two or more types.

The content of the second liquid crystal polyester resin in the present embodiment is preferably 5 parts by mass or more with respect to the total amount (100 parts by mass) of the resin pellets and the second liquid crystal polyester resin described above, more preferably 10 parts by mass or more, and even more preferably 15 parts by mass or more.

In addition, the content of the second liquid crystal polyester resin in the present embodiment is preferably 50 parts by mass or less with respect to the total amount (100 parts by mass) of the resin pellets and the second liquid crystal polyester resin described above, more preferably 45 parts by mass or less, and even more preferably 40 parts by mass or less.

For example, the content of the second liquid crystal polyester resin in the present embodiment is preferably 5 parts by mass to 50 parts by mass with respect to the total amount (100 parts by mass) of the resin pellets and the second liquid crystal polyester resin described above, more preferably 10 parts by mass to 45 parts by mass, and even more preferably 15 parts by mass to 40 parts by mass.

When the content of the second liquid crystal polyester is the preferable upper limit value or less, it is possible to further improve the molded article strength.

When the content of the second liquid crystal polyester is the preferable lower limit value or more, the moldability is further improved.

The content of the second liquid crystal polyester resin in the present embodiment is preferably 5 parts by mass or more with respect to the total amount (100 parts by mass) of the liquid crystal polyester resin composition of the present embodiment, more preferably 10 parts by mass or more, and even more preferably 15 parts by mass or more.

In addition, the content of the second liquid crystal polyester resin in the present embodiment is preferably 50 parts by mass or less with respect to the total amount (100 parts by mass) of the liquid crystal polyester resin composition of the present embodiment, more preferably 40 parts by mass or less, and even more preferably 30 parts by mass or less.

For example, the content of the second liquid crystal polyester resin in the present embodiment is preferably 5 parts by mass to 50 parts by mass with respect to the total amount (100 parts by mass) of the liquid crystal polyester resin composition of the present embodiment, more preferably 10 parts by mass to 40 parts by mass, and even more preferably 15 parts by mass to 30 parts by mass.

<Metal Salt of Higher Fatty Acid>

The metal salt of higher fatty acid in the present embodiment is a metal salt of a long-chain fatty acid having 12 or more carbon atoms.

The number of carbon atoms is preferably 12 or more and 28 or less, and the number of carbon atoms is more preferably 12 or more and 18 or less.

Specific examples of the long-chain fatty acids include lauric acid, myristic acid, palmitic acid, stearic acid, oleic acid, behenic acid, montanic acid, and the like.

Due to the liquid crystal polyester resin composition of the present embodiment containing a metal salt of higher fatty acid, the stability of the metering time during molding is improved and it is also possible to shorten the metering time during molding. Due to this, it is possible to reduce breakages of the fibrous filler included in the resin pellets during molding and to improve the molded article strength.

Specific examples of metal salt of higher fatty acids in the present embodiment include lithium laurate, calcium laurate, barium laurate, lithium stearate, barium stearate, sodium stearate, potassium stearate, calcium stearate, aluminum stearate, magnesium behenate, calcium behenate, barium behenate, and the like.

The melting point of the metal salt of higher fatty acid in the present embodiment is preferably 230° C. or lower, more preferably 180° C. or lower, and even more preferably 160° C. or lower.

When the melting point of the metal salt of higher fatty acid is the preferable upper limit value or less, molding is possible at lower temperatures and the fibrous filler is able to remain long, thus, it is possible to further improve the molded article strength (in particular, the impact strength).

The lower limit value of the melting point of metal salt of higher fatty acids is not particularly limited and, for example, is 90° C. or higher.

For example, the melting point of the metal salt of higher fatty acid is preferably 90° C. or higher and 230° C. or lower, more preferably 90° C. or higher and 180° C. or lower, and even more preferably 90° C. or higher and 160° C. or lower.

In the present specification, the melting point of the metal salt of higher fatty acid is the position of the highest temperature side endothermic peak observed when measured by differential calorimetry under a temperature rising condition of 10° C./min from room temperature.

Specific examples of metal salt of higher fatty acids with melting points of 230° C. or lower include calcium laurate, barium laurate, lithium stearate, barium stearate, sodium stearate, potassium stearate, calcium stearate, aluminum stearate, magnesium behenate, and calcium behenate, among which calcium behenate, magnesium behenate, and calcium stearate are preferable and calcium behenate is more preferable.

The content of the metal salt of higher fatty acid in the present embodiment is preferably 0.02 parts by mass or more with respect to the total amount (100 parts by mass) of the resin pellets and the second liquid crystal polyester resin described above.

In addition, the content of the metal salt of higher fatty acid in the present embodiment is preferably 0.15 parts by mass or less with respect to the total amount (100 parts by mass) of the resin pellets and the second liquid crystal polyester resin described above, more preferably 0.12 parts by mass or less, and even more preferably 0.08 parts by mass or less.

For example, the content of the metal salt of higher fatty acid in the present embodiment is preferably 0.02 parts by mass to 0.15 parts by mass with respect to the total amount (100 parts by mass) of the resin pellets and the second liquid crystal polyester resin described above, more preferably 0.02 parts by mass to 0.12 parts by mass, and even more preferably 0.02 parts by mass to 0.08 parts by mass.

When the content of metal salt of higher fatty acid is the preferable lower limit value or more, the molded article strength (in particular, the impact strength) is further improved. In addition, the molding processability is also further improved.

When the content of metal salt of higher fatty acids is the preferable upper limit value or less, decreases in molded article strength (in particular, the bending strength and tensile strength) are suppressed. In addition, contamination of the mold to be used, blistering of the molded article, and the like tend to be less likely to occur.

The content of the metal salt of higher fatty acid in the present embodiment is preferably 0.02 parts by mass or more with respect to the total amount (100 parts by mass) of the liquid crystal polyester resin composition of the present embodiment.

In addition, the content of the metal salt of higher fatty acid in the present embodiment is preferably 0.15 parts by mass or less with respect to the total amount (100 parts by mass) of the liquid crystal polyester resin composition of the present embodiment, more preferably 0.12 parts by mass or less, and even more preferably 0.08 parts by mass or less.

For example, the content of the metal salt of higher fatty acid in the present embodiment is preferably 0.02 parts by mass to 0.15 parts by mass with respect to the total amount (100 parts by mass) of the liquid crystal polyester resin composition of the present embodiment, more preferably 0.02 parts by mass to 0.12 parts by mass, and even more preferably 0.02 parts by mass to 0.08 parts by mass.

<Other Components>

In addition to the resin pellets, the second liquid crystal polyester resin, and the metal salt of higher fatty acid described above, the liquid crystal polyester resin composition of the present embodiment may contain one or more other fillers, additives, or the like, as necessary.

The other fillers may be plate-shaped fillers, spherical fillers, or other granular fillers. The other fillers may be inorganic fillers or may be organic fillers.

Examples of plate-shaped inorganic fillers include talc, mica, graphite, wollastonite, glass flakes, barium sulfate, and calcium carbonate. The mica may be potassium mica, magnesia mica, fluorine magnesia mica, or tetrasilicon mica.

Examples of granular inorganic fillers include silica, alumina, titanium dioxide, glass beads, glass balloons, boron nitride, silicon carbide, and calcium carbonate.

Examples of additives include flame retardants, conductivity imparting agents, crystal nucleating agents, UV absorbers, antioxidants, anti-vibration agents, antibacterial agents, insect repellents, deodorants, coloring inhibitors, heat stabilizers, mold release agents, antistatic agents, plasticizers, lubricants, colorants, pigments, dyes, foaming agents, antifoaming agents, viscosity modifiers, and surfactants.

The liquid crystal polyester resin composition of the present embodiment contains resin pellets, a second liquid crystal polyester resin, and a metal salt of higher fatty acid, in which the second liquid crystal polyester resin has a lower flow starting temperature than the resin pellets, the flow starting temperatures of the resin pellets and the second liquid crystal polyester resin are both 250° C. or higher, and a difference in the flow starting temperatures between the resin pellets and the second liquid crystal polyester resin is more than 10° C.

Among the above, in the liquid crystal polyester resin composition of the present embodiment, preferably, the difference in flow starting temperature between the resin pellets and the second liquid crystal polyester resin (flow starting temperature of the resin pellets—flow starting temperature of the second liquid crystal polyester resin) is 15° C. or more and both the resin pellets and the second liquid crystal polyester resin have a flow starting temperature of 260° C. or higher.

In addition, more preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 20° C. or more and both the resin pellets and the second liquid crystal polyester resin have a flow starting temperature of 260° C. or higher.

In addition, even more preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 25° C. or more and both the resin pellets and the second liquid crystal polyester resin have a flow starting temperature of 260° C. or higher and 400° C. or lower.

In addition, particularly preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 28° C. or more and both the resin pellets and the second liquid crystal polyester resin have a flow starting temperature of 260° C. or higher and 380° C. or lower.

In addition, for example, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) may be 21° C. or more and both the resin pellets and the second liquid crystal polyester resin may have a flow starting temperature of 284° C. or higher.

As described above, the liquid crystal polyester resin composition of the present embodiment contains resin pellets, a second liquid crystal polyester resin, and a metal salt of higher fatty acid. Additionally, the second liquid crystal polyester resin in the liquid crystal polyester resin composition of the present embodiment has a lower flow starting temperature than the resin pellets and the flow starting temperatures of the resin pellets and the second liquid crystal polyester resin are both 250° C. or higher. Furthermore, the difference in the flow starting temperatures between the resin pellets and the second liquid crystal polyester resin is more than 10° C. That is, in the present embodiment, it is presumed that, due to the metal salt of higher fatty acid being contained, it is possible to reduce the metering time during molding and, by using a combination of the resin pellets and the second liquid crystal polyester resin, for which the difference in the flow starting temperatures is more than 10° C., breakages of the fibrous filler included in the resin pellets during molding are reduced such that the fibrous filler is able to remain long, thus, it is possible to improve the molded article strength.

The present invention has the following aspects.

[1] A liquid crystal polyester resin composition including resin pellets including a first liquid crystal polyester resin and a fibrous filler, a second liquid crystal polyester resin, and a metal salt of higher fatty acid, in which the second liquid crystal polyester resin has a lower flow starting temperature than the resin pellets, flow starting temperatures of the resin pellets and the second liquid crystal polyester resin are both 250° C. or higher and 400° C. or lower, and a difference in the flow starting temperatures between the resin pellets and the second liquid crystal polyester resin is more than 10° C. and 40° C. or lower.

[2] The liquid crystal polyester resin composition according to [1] which contains, as a metal salt of higher fatty acid, a metal salt of higher fatty acid having a melting point of 230° C. or lower, in which, in the resin pellets, 100 parts by mass of the first liquid crystal polyester resin are preferably impregnated in 80 parts by mass to 250 parts by mass of the fibrous filler, more preferably impregnated in 120 parts by mass to 240 parts by mass of the fibrous filler, and even more preferably impregnated in 160 parts by mass to 220 parts by mass of the fibrous filler, the content of the fibrous filler is preferably more than 35 parts by mass and less than 65 parts by mass with respect to the total amount (100 parts by mass) of the resin pellets and the second liquid crystal polyester resin described above, more preferably 40 parts by mass or more and 60 parts by mass or less, and even more preferably 45 parts by mass or more and 55 parts by mass or less, the content of the second liquid crystal polyester resin is preferably 5 parts by mass to 50 parts by mass with respect to the total amount (100 parts by mass) of the resin pellets and the second liquid crystal polyester resin described above, more preferably 10 parts by mass to 45 parts by mass, and even more preferably 15 parts by mass to 40 parts by mass, and the content of the metal salt of higher fatty acid is preferably 0.02 parts by mass to 0.15 parts by mass with respect to the total amount (100 parts by mass) of the resin pellets and the second liquid crystal polyester resin described above, more preferably 0.02 parts by mass to 0.12 parts by mass, and even more preferably 0.02 parts by mass to 0.08 parts by mass.

[3] The liquid crystal polyester resin composition according to [1] or [2], in which the length weighted average fiber length of the fibrous filler is preferably 4 mm or more and less than 50 mm, more preferably 4.5 mm or more and 40 mm or less, even more preferably 5 mm or more and 20 mm or less, yet more preferably 5.5 mm or more and 15 mm or less, and particularly preferably 6 mm or more and 15 mm or less.

[4] The liquid crystal polyester resin composition according to any one of [1] to [3], in which the fibrous filler is carbon fibers or glass fibers.

[5] The liquid crystal polyester resin composition according to [1], in which when the liquid crystal polyester resin composition is used to produce a plate-shaped test piece having a width of 10 mm, a length of 80 mm, and a thickness of 4 mm by injection molding, the plate-shaped test piece is processed to have a 450 V-shaped groove (notch tip radius: 0.25 mm±0.05 mm) with a depth of 2 mm at the central section in the width direction of the plate-shaped test piece in accordance with ISO 2818 and JIS K7144 using a notching tool (model A-4, manufactured by Toyo Seiki Co., Ltd.), and the Charpy impact strength of the processed plate-shaped test piece is measured using a 7.5 J hammer in accordance with SO179-1 and JIS K7111-1, the Charpy impact strength is 70 or more.

[6] The liquid crystal polyester resin composition according to [1], in which, when the liquid crystal polyester resin composition is used to produce a plate-shaped test piece having a width of 10 mm, a length of 80 mm, and a thickness of 4 mm with a notch-less shape by injection molding and the plate-shaped test piece is measured for bending strength in accordance with ISO 178, the bending strength is 200 or more.

[7] The liquid crystal polyester resin composition according to [1], in which, when a plate-shaped test piece having a width of 10 mm, a length of 80 mm, and a thickness of 4 mm is produced by injection molding, the plate-shaped test piece is processed to have a 450 V-shaped groove (notch tip radius: 0.25 mm±0.05 mm) with a depth of 2 mm at the central section in the width direction of the plate-shaped test piece in accordance with ISO 2818 and JIS K7144 using a notching tool (model A-4, manufactured by Toyo Seiki Co., Ltd.), and the Charpy impact strength of the processed plate-shaped test piece is measured using a 7.5 J hammer in accordance with SO179-1 and JIS K7111-1, the Charpy impact strength is 70 or more, and, when a plate-shaped test piece having a width of 10 mm, a length of 80 mm, and a thickness of 4 mm is produced with a notch-less shape by injection molding and the plate-shaped test piece is measured for bending strength in accordance with ISO 178, the bending strength is 200 or more.

Among the above, preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 15° C. or more and both the resin pellets and the second liquid crystal polyester resin have a flow starting temperature of 260° C. or higher.

In addition, more preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 20° C. or more and both the resin pellets and the second liquid crystal polyester resin have a flow starting temperature of 260° C. or higher.

In addition, even more preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 25° C. or more and both the resin pellets and the second liquid crystal polyester resin have a flow starting temperature of 260° C. or higher and 400° C. or lower.

In addition, particularly preferably, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) is 28° C. or more and both the resin pellets and the second liquid crystal polyester resin have a flow starting temperature of 260° C. or higher and 380° C. or lower.

In addition, for example, in the liquid crystal polyester resin composition of the present embodiment, the difference in flow starting temperature between the resin pellets and the second liquid crystal polyester resin (flow starting temperature of the resin pellets—flow starting temperature of the second liquid crystal polyester resin) may be 21° C. or more and both the resin pellets and the second liquid crystal polyester resin may have a flow starting temperature of 284° C. or higher.

(Method for Manufacturing Liquid Crystal Polyester Resin Composition)

It is possible to manufacture the liquid crystal polyester resin composition of the present embodiment by mixing the resin pellets, the second liquid crystal polyester resin, the metal salt of higher fatty acid, and other components described above as necessary.

[Method for Manufacturing Resin Pellets]

In the method for manufacturing resin pellets in the present embodiment, for example, it is possible to obtain the resin pellets by melting and kneading the first liquid crystal polyester resin and other components as necessary, impregnating the obtained melt in a fibrous filler, and carrying out pelletizing.

FIG. 1 shows an embodiment of a resin pellet manufacturing apparatus.

In the present embodiment shown in FIG. 1, a description will be given of a case of obtaining resin pellets 15 using a fiber roving 10 in which a fiber bundle 11 in which a plurality of fibrous fillers are made to converge with a converging agent is rolled up into a roll.

As shown in FIG. 1, a manufacturing apparatus 100 is provided with a pre-heating section 121, an impregnation section 123, a cooling section 125, a take-up section 127, a cutting section 129, and transport rolls 101 to 109. In the manufacturing apparatus 100 shown in FIG. 1, an extruder 120 is connected to the impregnation section 123.

FIG. 1 shows a state in which the fiber bundle 11 is continuously unrolled from the fiber roving 10. In the present embodiment, the resin pellets 15 are produced while the fiber bundle 11 unrolled from the fiber roving 10 is transported in the longitudinal direction by the transport rolls 101 to 109.

The fineness of the fiber roving 10 used in the manufacturing of the resin pellets in the present embodiment is not particularly limited, but 200 g/1000 m or more is preferable, 500 g/1000 m or more is more preferable, and 800 g/1000 m or more is even more preferable. When the fineness of the fiber roving 10 is the lower limit value or more of the preferable range described above, the fiber roving 10 is easy to handle in the method for manufacturing resin pellets.

In addition, the fineness of the fiber roving 10 is preferably 3750 g/1000 m or less, more preferably 3200 g/1000 m or less, and even more preferably 2500 g/1000 m or less. When the fineness of the fiber roving 10 is the upper limit value or less of the preferable range described above, the fibers are easily dispersed in the first liquid crystal polyester resin. In addition, the fibers are easy to handle during the manufacturing of the resin pellets.

That is, the fineness of the fiber roving 10 is preferably 200 g/1000 m or more and 3750 g/1000 m or less, and more preferably 800 g/1000 m or more and 2500 g/1000 m or less.

The number-average fiber diameter of the fiber roving 10 is not particularly limited, but is preferably 1 μm to 40 μm and more preferably 3 μm to 35 μm.

In a case where the fibrous filler is carbon fibers, 1 μm to 15 μm is preferable, 3 μm to 10 μm is more preferable, and 4 μm to 9 μm is even more preferable.

In a case where the fibrous filler is glass fibers, 5 μm to 35 μm is preferable, 10 μm to 25 μm is more preferable, and 10 μm to 20 μm is even more preferable.

As the number-average fiber diameter of the fiber roving 10, the fibrous filler is observed by a scanning electron microscope (1000 times) and the number-average value of a value measuring the fiber diameter for 500 randomly selected fibrous fillers is adopted.

When the number-average fiber diameter of the fiber roving 10 is the lower limit value or more of the preferable range described above, the fibrous filler is easily dispersed in the resin pellets. In addition, the fibrous filler is easy to handle during the manufacturing of the resin pellets. On the other hand, when the value is the upper limit value or less of the preferable range described above, strengthening of the molded article by the fibrous filler is performed efficiently. Therefore, it is possible to improve the molded article strength.

In the present embodiment, the fibrous filler which is used is processed with a sizing-agent. A fibrous filler which is appropriately subjected to sizing processing has excellent productivity and quality stability during pellet production and is able to reduce the variation of physical properties in molded articles.

Sizing-agents are not particularly limited and examples thereof include nylon-based polymers, polyether-based polymers, epoxy-based polymers, ester-based polymers, urethane-based polymers, mixed polymers thereof or modified polymers of each of the above. In addition, it is also possible to use known coupling agents such as so-called silane coupling agents such as amino silane and epoxy silane, and titanium coupling agents.

The fibrous filler used in the resin pellets of the present embodiment does not necessarily require the single fibers be arranged in one direction, but from the viewpoint of productivity in the process of manufacturing the molding material, a state in which the single fibers are arranged in one direction and the fiber bundle is continuous over the length direction of the fibers is preferable.

In a case where the fibrous filler is glass fibers, from the viewpoint of economy and impregnation improvement, the number of single fibers in the fiber roving 10 is preferably 1000 or more and 10000 or less, more preferably 1000 or more and 8000 or less, and even more preferably 1500 or more and 6000 or less.

In addition, in a case where the fibrous filler is carbon fibers, from the same viewpoint, the number of single fibers of the fiber roving 10 is preferably 10000 or more and 100000 or less, more preferably 10000 or more and 50000 or less, and even more preferably 10000 or more and 30000 or less.

In the pre-heating section 121, the fiber bundle 11 to be unrolled from the fiber roving 10 is dried by heating. The heating temperature at that time is not particularly limited, but is, for example, 50° C. to 250° C.

In addition, the heating time in the pre-heating section 121 is not particularly limited and is, for example, 3 seconds to 30 seconds.

In the impregnation section 123, a molding material M (the first liquid crystal polyester resin and other components as necessary to be blended) other than the fiber bundle 11 is impregnated in the fiber bundle 11.

The first liquid crystal polyester resin is appropriately selected in consideration of the type of the second liquid crystal polyester resin, melting viscosity, flow starting temperature, and the like, as described below.

One type of the first liquid crystal polyester resin may be used alone, or two or more types may be used in combination.

The molding material M may be introduced from a supply port 123*a* and the melt obtained by heating in the impregnation section 123 may be impregnated in the fiber bundle 11, or the molding material M melted and kneaded in the extruder 120 may be introduced from the supply port 123*a* to be impregnated in the fiber bundle 11.

Then, in the embodiment shown in FIG. 1, a resin structure 13 is obtained in which the melt is impregnated in and coated on the fiber bundle 11.

The heating temperature in the impregnation section 123 is appropriately determined according to the type of the first liquid crystal polyester resin and is preferably set at a temperature 10° C. to 80° C. higher than the flow starting temperature of the first liquid crystal polyester resin used, for example, 300° C. to 400° C.

In the impregnation section 123, depending on the characteristics and the like demanded for the molded article, 100 parts by mass of the first liquid crystal polyester resin are preferably impregnated in 80 parts by mass to 250 parts by mass of fibrous filler (fiber bundle 11), more preferably 120 parts by mass to 240 parts by mass of fibrous filler, and even more preferably 160 parts by mass to 220 parts by mass of fibrous filler.

When the blending amount of the fibrous filler is the lower limit value or more of the preferable range described above, the molded article strength is further improved. On the other hand, when the amount is the upper limit value or less of the preferable range described above, the opening of the fiber bundle and impregnation of the first liquid crystal polyester resin in the fiber bundle is easy.

Changing the nozzle diameter of a die head at an outlet of the impregnation section 123 with respect to the diameter of the fiber bundle 11 makes it possible to adjust the blending ratio of the first liquid crystal polyester resin and the fibrous filler in the resin structure 13.

In the cooling section 125, the resin structure 13 in a state of being heated in the impregnation section 123 (the resin structure 13 in which the melt is impregnated in and coated on the fiber bundle) is cooled to, for example, 50° C. to 150° C. The cooling time is not particularly limited and is, for example, 3 seconds to 30 seconds.

In the take-up section 127, the resin structure 13 cooled in the cooling section 125 is continuously taken up and unrolled to the next cutting section 129.

In the cutting section 129, the resin structure 13 after cooling is cut to a desired length to produce the resin pellets 15. The cutting section 129 is provided with, for example, a rotary blade or the like.

Using the manufacturing apparatus 100 described above, as the resin pellets of the present embodiment, for example, pellets in which a fibrous filler is hardened with a first liquid crystal polyester resin are manufactured as follows.

Step of Obtaining Resin Structure:

While continuously unrolling the fiber bundle 11, in which a plurality of single fibers are made to converge with a converging agent, from the fiber roving 10, first, the fiber bundle 11 is dried by heating in the pre-heating section 121.

Next, while supplying the fiber bundle 11 after drying to the impregnation section 123, the molding material M, which is melted and kneaded by the extruder 120, is introduced from the supply port 123*a* to impregnate the fiber bundle 11 with the molding material M in the molten state. Due to this, the resin structure 13 is obtained in which the melt is impregnated in and coated on the fiber bundle. Thereafter, the resin structure 13 in the heated state in the impregnation section 123 is cooled in the cooling section 125.

In the resin structure 13 obtained here, the fibers are arranged approximately in parallel to the longitudinal direction of the resin structure 13.

"The fibers are arranged approximately in parallel to the longitudinal direction of the resin structure" means that the angle between the longitudinal direction of the fibers and the longitudinal direction of the resin structure is approximately 0°, specifically, a state where the angle between the respective longitudinal directions of the fibers and the resin structure is −5° to 5°.

Step of Obtaining Pellets:

Next, the resin structure 13 after cooling is taken up in strand form at the take-up section 127 and unrolled to the cutting section 129.

Next, in the cutting section 129, the resin structure 13 in strand form is cut in the longitudinal direction at predetermined lengths to obtain the resin pellets 15.

Here, the predetermined length for the resin pellets 15 means the length of the resin pellets 15 set according to the performance demanded of the molded article for which the resin pellets 15 are the material. In the resin pellets obtained by the manufacturing method of the present embodiment, the length of the resin pellets 15 and the length of the fibers arranged in the resin pellets 15 are substantially the same lengths.

"The length of the pellets and the length of the fibers are substantially the same lengths" means that the length weighted average fiber length of the fibers arranged in the pellets is 95% to 105% of the length of the pellets in the longitudinal direction.

As described above, resin pellets (the resin pellets 15) including the first liquid crystal polyester resin and the fibrous filler are manufactured.

In the resin pellets 15, the fibrous filler is hardened with the first liquid crystal polyester resin and the fibrous filler is arranged to be approximately in parallel to the longitudinal direction of the pellets. In addition, the length of the fibrous filler arranged in the resin pellets 15 is substantially the same length as the length of the pellets. The length of the resin pellets 15 manufactured in the present embodiment is, for example, 3 mm to 50 mm, depending on the performance or the like demanded of the molded article for which the resin pellets 15 are the material.

In this manner, the fibrous filler is arranged to be approximately in parallel to the longitudinal direction of the pellets and the length of the fibrous filler is substantially the same length as the length of the pellets, due to this, for example, it is possible for the remaining fibrous filler in the injection-molded article to be made into long fibers when forming the injection-molded article, which is effective in improving the strength, improving the heat resistance, and for the anisotropic relaxation of the molded article.

It is possible to confirm the arrangement direction of the fibrous filler in the resin pellets by observing the cross-section of the resin pellets cut in the longitudinal direction, with a microscope.

In addition, as the length of the fibrous filler in the resin pellets, the length weighted average fiber length determined by the same procedure as the fiber length measurement of the fibrous filler in the resin pellets described above is adopted.

[Method for Manufacturing Second Resin Pellets]

For the second liquid crystal polyester resin, pellets (second resin pellets) including the second liquid crystal polyester resin may be produced by pelletizing a mixture in which the second liquid crystal polyester resin and other components as necessary are blended, using a melt extrusion molding method or a melt compression molding method. In addition, the difference in pellet length between the second resin pellets and the resin pellets 15 is preferably 15 mm or less and more preferably 5 mm or less.

The smaller the difference in pellet length between the second resin pellets and the resin pellets 15, the more effective the reduction of strength variation and the reduction of fibrous filler filling amount variation in the molded articles produced using the liquid crystal polyester resin composition containing the second resin pellets and the resin pellets 15.

In the manufacturing method of the present embodiment, mixing may be carried out after all components are added, mixing may be carried out while sequentially adding some of the components, or mixing may be carried out while sequentially adding all of the components. That is, the resin pellets, the second liquid crystal polyester resin, and the metal salt of higher fatty acids may be mixed from the beginning, or the metal salt of higher fatty acids may be added to a mixture of the resin pellets and the second liquid crystal polyester resin. In addition, the metal salt of higher fatty acids may be added to resin pellets coated with the second liquid crystal polyester resin.

(Molded Article)

The molded article of the present embodiment is a molded article produced using the liquid crystal polyester resin composition described above.

It is possible to obtain the molded article of the present embodiment by a known molding method using the liquid crystal polyester resin composition. As a method for molding the liquid crystal polyester resin composition of the present embodiment, a melt molding method is preferable and examples thereof include injection molding methods, extrusion molding methods such as a T-die method or an inflation method, compression molding methods, blow molding methods, vacuum molding methods, and press molding. Among the above, an injection molding method is preferable.

For example, in a case where the liquid crystal polyester resin composition described above is used as a molding material and molded by an injection molding method, the liquid crystal polyester resin composition is melted using a known injection molding machine and the melted liquid crystal polyester resin composition is molded by injection into a mold.

Here, when the liquid crystal polyester resin composition is introduced into the injection molding machine, each component (resin pellets, second liquid crystal polyester resin, metal salt of higher fatty acid, and the like) may be introduced into the injection molding machine separately, or some or all of the components may be mixed in advance and introduced into the injection molding machine as a mixture.

Examples of known injection molding machines include TR450EH3 manufactured by Sodick Co., Ltd., the PS40E5ASE model hydraulic horizontal molding machine manufactured by Nissei Plastic Industrial Co., Ltd., and the like.

The temperature conditions for injection molding are appropriately determined according to the type of liquid crystal polyester resin and it is preferable to set the cylinder temperature of the injection molding machine to a temperature 10° C. to 80° C. higher than the flow starting temperature of the liquid crystal polyester resin to be used.

For example, the melting and kneading temperature (plasticizing section) is preferably higher than the flow starting temperature of the second liquid crystal polyester resin described above and equal to or lower than the flow starting temperature of the first liquid crystal polyester resin described above or the resin pellets described above. Specifically, the melting and kneading temperature (plasticizing section) is preferably 250° C. to 350° C., more preferably 260° C. to 340° C., and even more preferably 270° C. to 320° C.

The temperature of the metering section or plunger section is preferably 280° C. to 400° C., more preferably 290° C. to 380° C., and even more preferably 300° C. to 370° C.

The temperature of the mold is preferably set in the range of room temperature (for example, 23° C.) to 180° C. in terms of the cooling speed and productivity of the liquid crystal polyester resin composition.

Other injection conditions, such as the screw rotation speed, back pressure, injection speed, holding pressure, and holding pressure time, may be adjusted as appropriate.

The molded article of the present embodiment described above is able to be applied to any application to which a liquid crystal polyester resin is applicable in general and is particularly suitable for applications in the automotive field.

Examples of applications in the automotive field include, as injection-molded articles for automobile interior materials, injection-molded articles for ceiling materials, injection-molded articles for wheelhouse covers, injection-molded articles for trunk compartment linings, injection-molded articles for instrument panel surface materials, injection-molded articles for steering wheel covers, injection-molded articles for armrests, injection-molded articles for headrests, injection-molded articles for seat belt covers, injection-molded articles for shift lever boots, injection-molded articles for console boxes, injection-molded articles for horn pads, injection-molded articles for knobs, injection-molded articles for airbag covers, injection-molded articles for various trims, injection-molded articles for various pillars, injection-molded articles for door lock bezels, injection-molded articles for grab boxes, injection-molded articles for defroster nozzles, injection-molded articles for scuff plates, injection-molded articles for steering wheels, injection-molded articles for steering column covers, and the like.

In addition, examples of applications in the automotive field include, as injection-molded articles for automobile exterior materials, injection-molded articles for bumpers, injection-molded articles for spoilers, injection-molded articles for mudguards, injection-molded articles for side moldings, injection-molded articles for door mirror housings, injection-molded articles for underbody shields, and the like.

Examples of other injection-molded articles for automobile parts include injection-molded articles for automobile headlamps, injection-molded articles for glass run channels, injection-molded articles for weather strips, injection-molded articles for hoses such as injection-molded articles for drain hoses and injection-molded articles for windshield washer tubes, injection-molded articles for tubes, injection-molded articles for rack and pinion boots, injection-molded articles for gaskets, injection-molded articles for bumper beams, injection-molded articles for crash boxes, injection-molded articles for various members, injection-molded articles for suspension systems, injection-molded articles for front end modules, injection-molded articles for radiator supports, injection-molded articles for back door interiors, and the like.

In addition, in addition to the above, it is also possible to apply the molded article of the present embodiment to applications such as sensors, LED lamps, connectors, sockets, resistors, relay cases, switches, coil bobbins, capacitors, variable condenser cases, optical pickups, oscillators, various terminal boards, transformers, plugs, printed circuit boards, tuners, speakers, microphones, headphones, small motors, magnetic head bases, power modules, semiconductors, liquid-crystal displays, FDD carriages, FDD chassis, motor brush holders, parabolic antennas, computer related parts, microwave oven parts, sound and voice equipment parts, lighting parts, air conditioner parts, office computer related parts, telephone and fax-related parts, and copier-related parts.

The molded article of the present embodiment described above uses the liquid crystal polyester resin composition described above and thus has improved strength.

One aspect of the molded article of the present embodiment is a molded article produced using the liquid crystal polyester resin composition including glass fibers described above, in which, when a plate-shaped test piece having a width of 10 mm, a length of 80 mm, and a thickness of 4 mm is produced by injection molding, the plate-shaped test piece is processed to have a 450 V-shaped groove (notch tip radius: 0.25 mm±0.05 mm) with a depth of 2 mm at the central section in the width direction of the plate-shaped test piece in accordance with ISO 2818 and JIS K7144 using a notching tool (model A-4, manufactured by Toyo Seiki Co., Ltd.), and the Charpy impact strength of the processed plate-shaped test piece is measured using a 7.5 J hammer in accordance with SO179-1 and JIS K7111-1, the Charpy impact strength is 70 or more.

One aspect of the molded article of the present embodiment is a molded article produced using the liquid crystal polyester resin composition including glass fibers described above, in which, when a plate-shaped test piece having a width of 10 mm, a length of 80 mm, and a thickness of 4 mm is produced with a notch-less shape by injection molding and the plate-shaped test piece is measured for bending strength in accordance with ISO 178, the bending strength is 200 or more.

One aspect of the molded article of the present embodiment is a molded article produced using the liquid crystal polyester resin composition including glass fibers described above, in which, when a plate-shaped test piece having a width of 10 mm, a length of 80 mm, and a thickness of 4 mm is produced by injection molding, the plate-shaped test piece is processed to have a 45° V-shaped groove (notch tip radius: 0.25 mm±0.05 mm) with a depth of 2 mm at the central section in the width direction of the plate-shaped test piece in accordance with ISO 2818 and JIS K7144 using a notching tool (model A-4, manufactured by Toyo Seiki Co., Ltd.), and the Charpy impact strength of the processed plate-shaped test piece is measured using a 7.5 J hammer in accordance with SO179-1 and JIS K7111-1, the Charpy impact strength is 70 or more, and, when a plate-shaped test piece having a width of 10 mm, a length of 80 mm, and a thickness of 4 mm is produced with a notch-less shape by injection molding and the plate-shaped test piece is measured for bending strength in accordance with ISO 178, the bending strength is 200 or more.

EXAMPLES

A more detailed description will be given of the present invention by means of specific Examples below. However, the present invention is not limited in any way to the Examples shown below.

[Flow Starting Temperature of Liquid Crystal Polyester Resin]

For the liquid crystal polyester resin described below, the flow starting temperature was evaluated using a flow tester (CFT-500 model, manufactured by Shimadzu Corporation). Specifically, approximately 2 g of a liquid crystal polyester resin was filled into a capillary rheometer with a die of 1 mm inner diameter and 10 mm length. Next, when the filled liquid crystal polyester resin was extruded from the nozzle of the rheometer with a temperature increase of 4° C./min and a load of 9.8 MPa (100 kg/cm$^2$), the temperature at which the melting viscosity was 4,800 Pa·s (48,000 poise) was set as the flow starting temperature.

[Flow Starting Temperature of Resin Pellets]

For the resin pellets described below, the flow starting temperature was evaluated using a flow tester (CFT-500 model, manufactured by Shimadzu Corporation). Specifically, first, using a ball mill type freeze-grinder ("JFC-1500", manufactured by Japan Analytical Industry), the resin pellets were freeze-ground under predetermined conditions (resin pellet introduction amount: 5 g, pre-freezing time: 10 min, and freeze-grinding time: 10 min).

Next, the flow starting temperature of the resin pellets was measured in the same manner as in the above [Flow starting temperature of Liquid crystal polyester Resin], except that the liquid crystal polyester resin was changed to the resin pellet freeze-ground material.

<Manufacturing of Neat Pellets>

Neat pellets (1) to (4) of processed liquid crystal polyester resin were manufactured, respectively.

<<Manufacturing of Neat Pellets (1)>>

Neat pellets (1) (LCP 1) were manufactured in the following manner.

p-hydroxybenzoic acid (994.5 g, 7.2 moles), 4,4'-dihydroxybiphenyl (446.9 g, 2.4 moles), terephthalic acid (299.0 g, 1.8 moles), isophthalic acid (99.7 g, 0.6 moles), and acetic anhydride (1347.6 g, 13.2 moles), and 0.2 g of 1-methylimidazole were placed in a reactor equipped with a stirrer, a torque meter, a nitrogen gas inlet pipe, a thermometer, and a reflux cooler and the inside of the reactor was thoroughly substituted with nitrogen gas. Thereafter, the temperature was raised from room temperature to 150° C. over 30 minutes under a stream of nitrogen gas and held at 150° C. to carry out refluxing for 1 hour. Next, 1-methylimidazole (0.9 g) was added thereto, the temperature was raised from 150° C. to 320° C. over 2 hours and 50 minutes while distilling off byproduct acetic acid and unreacted acetic anhydride, the point where an increase in torque was observed was set as the end of the reaction, the contents were extracted, and the results were cooled to room temperature. After grinding the obtained solids to a particle diameter of approximately 0.1 mm to 1 mm using a grinding machine, solid phase polymerization was performed under a nitrogen atmosphere by raising the temperature from room temperature to 250° C. over 1 hour, raising the temperature from 250° C. to 285° C. over 5 hours, and holding the temperature at 285° C. for 3 hours. After the solid phase polymerization, a powdered liquid crystal polyester resin was obtained by cooling.

Here, with respect to the total amount of all repeating units, the obtained liquid crystal polyester resin had 60 mol % of the repeating unit (1) in which $Ar^1$ is a 1,4-phenylene group, 15 mol % of the repeating unit (2) in which $Ar^2$ is a 1,4-phenylene group, 5 mol % of the repeating unit (2) in which $Ar^2$ is a 1,3-phenylene group, and 20 mol % of the repeating unit (3) in which $Ar^3$ is a 4,4'-biphenylylene group and the flow starting temperature thereof was 327° C.

The obtained powdered liquid crystal polyester resin was granulated in a twin-screw extruder (PMT47, manufactured by IKG Corporation) at a cylinder temperature of 320° C. to manufacture LCP 1. The flow starting temperature of the obtained LCP 1 was 315° C.

<<Manufacturing of Neat Pellets (2)>>

Neat pellets (2) (LCP 2) were manufactured as follows.

p-hydroxybenzoic acid (994.5 g, 7.2 moles), 4,4'-dihydroxybiphenyl (446.9 g, 2.4 moles), terephthalic acid (239.2 g, 1.44 moles), isophthalic acid (159.5 g, 0.96 moles), and acetic anhydride (1347.6 g, 13.2 moles) were charged in a reactor equipped with a stirrer, a torque meter, a nitrogen gas inlet pipe, a thermometer, and a reflux cooler, 1-methylimidazole (0.9 g) was added thereto, and the inside of the reactor was thoroughly substituted with nitrogen gas. Thereafter, the temperature was raised from room temperature to 150° C. over 30 minutes under a stream of nitrogen gas and held at 150° C. to carry out refluxing for 1 hour. Next, 0.9 g of 1-methylimidazole was added thereto, the temperature was raised from 150° C. to 320° C. over 2 hours and 50 minutes while distilling off byproduct acetic acid and unreacted acetic anhydride, the point where an increase in torque was observed was set as the end of the reaction, the contents were extracted, and the results were cooled to room temperature. After grinding the obtained solids to a particle diameter of approximately 0.1 mm to 1 mm using a grinding machine, solid phase polymerization was performed under a nitrogen atmosphere by raising the temperature from room temperature to 220° C. over 1 hour, raising the temperature from 220° C. to 240° C. over 0.5 hours, and holding the temperature at 240° C. for 10 hours. After the solid phase polymerization, a powdered liquid crystal polyester resin was obtained by cooling.

Here, with respect to the total amount of all repeating units, the obtained liquid crystal polyester resin had 60 mol % of the repeating unit (1) in which $Ar^1$ is a 1,4-phenylene group, 12 mol % of the repeating unit (2) in which $Ar^2$ is a 1,4-phenylene group, 8 mol % of the repeating unit (2) in which $Ar^2$ is a 1,3-phenylene group, and 20 mol % of the repeating unit (3) in which $Ar^3$ is a 4,4'-biphenylylene group and the flow starting temperature thereof was 291° C.

The obtained powdered liquid crystal polyester resin was granulated in a twin-screw extruder (PMT47, manufactured by TKG Corporation) at a cylinder temperature of 290° C. to manufacture LCP 2. The flow starting temperature of the obtained LCP 2 was 284° C.

<<Manufacturing of Neat Pellets (3)>>

Neat pellets (3) (LCP 3) were manufactured as follows.

6-hydroxy-2-naphthoic acid (1034.99 g, 5.5 moles), 2,6-naphthalenedicarboxylic acid (378.33 g, 1.75 moles), terephthalic acid (83.07 g, 0.5 moles), hydroquinone (272.52 g, 2.475 moles, 0.225 moles excess with respect to the total amount of 2,6-naphthalenedicarboxylic acid and terephthalic acid), acetic anhydride (1226.87 g, 12 moles), and 1-methylimidazole (0.17 g) as a catalyst were placed in a reactor equipped with a stirrer, a torque meter, a nitrogen gas inlet pipe, a thermometer, and a reflux cooler, the gas in the reactor was substituted with nitrogen gas, then, the temperature was raised from room temperature to 145° C. over 15 minutes while stirring under a stream of nitrogen gas, and refluxing was carried out at 145° C. for 1 hour. Next, the temperature was raised from 145° C. to 310° C. over 3.5 hours while distilling off byproduct acetic acid and unreacted acetic anhydride and held at 310° C. for 3 hours, the contents were extracted, and the results were cooled to room temperature. After grinding the obtained solids to a particle diameter of approximately 0.1 mm to 1 mm using a grinding machine, solid phase polymerization was performed under a nitrogen atmosphere by raising the temperature from room temperature to 250° C. over 1 hour, raising the temperature from 250° C. to 310° C. over 10 hours, and holding the temperature at 310° C. for 5 hours. After the solid phase polymerization, a powdered liquid crystal polyester resin was obtained by cooling.

Here, with respect to the total amount of all repeating units, the obtained liquid crystal polyester resin had 55 mol % of the repeating unit (1) in which $Ar^1$ is a 2,6-naphthylene group, 17.5 mol % of the repeating unit (2) in which $Ar^2$ is a 2,6-naphthylene group, 5 mol % of the repeating unit (2) in which $Ar^2$ is a 1,4-phenylene group, and 22.5 mol % of the repeating unit (3) in which $Ar^3$ is a 1,4-phenylene group and the flow starting temperature thereof was 322° C.

The obtained powdered liquid crystal polyester resin was granulated in a twin-screw extruder (PMT47, manufactured by IKG Corporation) at a cylinder temperature of 320° C. to manufacture LCP 3. The flow starting temperature of the obtained LCP 3 was 303° C.

<<Manufacturing of Neat Pellets (4)>>

Neat pellets (4) (LCP 4) were manufactured as follows.

6-hydroxy-2-naphthoic acid (1034.99 g, 5.5 moles), 2,6-naphthalenedicarboxylic acid (378.33 g, 1.75 moles), terephthalic acid (83.07 g, 0.5 moles), hydroquinone (272.52 g, 2.475 moles, 0.225 moles excess with respect to the total amount of 2,6-naphthalenedicarboxylic acid and terephthalic acid), acetic anhydride (1226.87 g, 12 moles), and 1-methylimidazole (0.17 g) as a catalyst were placed in a reactor equipped with a stirrer, a torque meter, a nitrogen gas inlet pipe, a thermometer, and a reflux cooler, the gas in the reactor was substituted with nitrogen gas, then, the temperature was raised from room temperature to 145° C. over 15 minutes while stirring under a stream of nitrogen gas, and refluxing was carried out at 145° C. for 1 hour. Next, the temperature was raised from 145° C. to 310° C. over 3.5 hours while distilling off byproduct acetic acid and unreacted acetic anhydride and held at 310° C. for 3 hours, the contents were extracted, and the results were cooled to room temperature. After grinding the obtained solids to a particle diameter of approximately 0.1 mm to 1 mm using a grinding machine, solid phase polymerization was performed under a nitrogen atmosphere by raising the temperature from room temperature to 250° C. over 1 hour, raising the temperature from 250° C. to 295° C. over 8 hours, and holding the temperature at 295° C. for 6 hours. After the solid phase polymerization, a powdered liquid crystal polyester resin was obtained by cooling.

Here, with respect to the total amount of all repeating units, the obtained liquid crystal polyester resin had 55 mol % of the repeating unit (1) in which $Ar^1$ is a 2,6-naphthylene group, 17.5 mol % of the repeating unit (2) in which $Ar^2$ is a 2,6-naphthylene group, 5 mol % of the repeating unit (2) in which $Ar^2$ is a 1,4-phenylene group, and 22.5 mol % of the repeating unit (3) in which $Ar^3$ is a 1,4-phenylene group and the flow starting temperature thereof was 300° C.

The obtained powdered liquid crystal polyester resin was granulated in a twin-screw extruder (PMT47, manufactured by IKG Corporation) at a cylinder temperature of 300° C. to manufacture LCP 4. The flow starting temperature of the obtained LCP 4 was 294° C.

<Neat Pellets of Other Resins (PA)>

UBE Nylon 1013B (PA) manufactured by Ube Industries, Ltd., was used as the neat pellets of a resin (other resin) other than the liquid crystal polyester resin described above.

The flow starting temperature of PA was 226° C.

<Manufacturing of Resin Pellets (1)>

Resin pellets 1 to 4, in which a liquid crystal polyester resin was impregnated in a fibrous filler, were manufactured respectively.

Resin pellets 1 to 4 were manufactured as follows using the same manufacturing apparatus as the form shown in FIG. 1.

A GTS-40 type extruder (manufactured by PLABOR Research Laboratory of Plastics Technology Co., Ltd.) was used as the extruder 120. An EBD-1500A (manufactured by IMEX Corporation) was used as the belt-type take-up machine. The glass fibers described below were used as the fibrous filler.

Fibrous filler: Glass fiber roving (GF) (HME-glass, number-average fiber diameter 17 μm, fineness 1180 g/1000 m) manufactured by Nitto Boseki Co., Ltd.

<<Manufacturing of Resin Pellets 1>>

LCP 1 and LCP 2 described above were used as the neat pellets.

The resin structure 13 was obtained in which the fibrous filler (glass fiber) was 192 parts by mass with respect to a total of 100 parts by mass of LCP 1 and LCP 2 (75 parts by mass for LCP 1 and 25 parts by mass for LCP 2). Specifically, manufacturing was carried out in the following manner.

Step of Obtaining Resin Structure:

While continuously unrolling the glass fiber bundle 11 from the glass fiber roving 10 at a take-up speed of 10 m/min by operating the belt-type take-up machine (the take-up section 127) described above, first, the glass fiber bundle 11 was dried by heating to 150° C. in the pre-heating section 121.

Next, while supplying the dried glass fiber bundle 11 into a die (the impregnation section 123) attached to the tip of the extruder 120, LCP 1 and LCP 2 in a molten state were introduced from the extruder 120 through the supply port 123a. The LCP 1 and LCP 2 were melted at 380° C. in the die (the impregnation section 123), impregnated in the glass fiber bundle 11, the strand diameter was adjusted using a die head with a nozzle diameter of 1.1 mm at the die (the impregnation section 123) outlet and, due to this, the resin structure 13 was obtained in which the fibrous filler (glass fiber) was 192 parts by mass with respect to a total of 100 parts by mass of LCP 1 and LCP 2 (75 parts by mass for LCP 1 and 25 parts by mass for LCP 2).

Here, in the obtained resin structure 13, the glass fibers were arranged approximately in parallel to the longitudinal direction of the first liquid crystal polyester resin layer.

Thereafter, the resin structure 13 in the heated state in the die (the impregnation section 123) was cooled to 150° C. or lower by the cooling section 125.

Step of Obtaining Pellets:

Next, the resin structure 13 after cooling was taken up in strand form by the belt-type take-up machine (the take-up section 127), unrolled to a pelletizer (the cutting section 129), and cut at a predetermined length (9 mm or 12 mm) in the longitudinal direction thereof to obtain the resin pellets 1 with a cylindrical shape.

The flow starting temperature of the resin pellets 1 was 314° C.

[Measurement of Length Weighted Average Fiber Length of Glass Fibers in Resin Pellets]

The resin pellets 1 were cut in the longitudinal direction and the cross-section obtained by cutting was observed with a microscope. As a result of the observation, it was confirmed that the arrangement direction of the glass fibers approximately matched the longitudinal direction of the resin pellets 1 and was approximately in parallel to the longitudinal direction of the resin pellets 1.

In addition, the length weighted average fiber length of the glass fibers in the resin pellets 1 was determined by the following procedures.

Procedure (1); 2 g of resin pellets were heated at 600° C. for 4 hours in a muffle furnace to remove the resin content (first liquid polyester resin).

Procedure (2); The resin content was removed from the resin pellets and the glass fibers alone were dispersed in 1000 mL of an aqueous solution containing 0.05% by volume of a surfactant (Micro 90, manufactured by International Products Corporation) to prepare a glass fiber dispersion solution.

Procedure (3); 100 mL was extracted from the glass fiber dispersion solution and diluted to 10 times with pure water. 50 mL was extracted from the dispersion solution after dilution and dispersed in a Petri dish, then, the glass fibers dispersed in the Petri dish were observed with a microscope (VH-Z25, manufactured by Keyence Corporation, magnification 10 times), and 10 images were taken per sample such that the imaged regions did not overlap.

Procedure (4); The lengths of all the glass fibers present in one taken image were measured with the measuring tool of the microscope. Here, bent glass fibers were measured by multipoint-to-point measurement and fibers contacting the edge of the image were not measured. The same operation was performed sequentially with 10 taken images until the total number of measured glass fibers was more than 500 and the fiber length of the glass fibers was measured.

Procedure (5); From the fiber lengths of the glass fibers measured in Procedure (4), the length weighted average fiber length $lm=(\Sigma li^2 \times ni)/(\Sigma li \times ni)$ was determined ($\Sigma ni > 500$).

li: Fiber length of glass fibers ni: Number of glass fibers with fiber length li As a result, the length weighted average fiber length of the glass fibers was the same as the length of the pellets (9 mm or 12 mm).

<<Manufacturing of Resin Pellets 2>>

LCP 1 described above was used as the neat pellets.

The resin structure 13 was obtained in which the fibrous filler (glass fiber) was 200 parts by mass with respect to 100 parts by mass of LCP 1.

Other than the above, the resin pellets 2 with a cylindrical shape (length 12 mm) were obtained in the same manner as in the manufacturing of the resin pellets 1 described above.

The length weighted average fiber length of the glass fibers in the resin pellets 2 was the same as the length of the pellets (12 mm).

The flow starting temperature of the resin pellets 2 was 321° C.

<<Manufacturing of Resin Pellets 3>>

LCP 1 and LCP 2 described above were used as the neat pellets.

The resin structure 13 was obtained in which the fibrous filler (glass fiber) was 200 parts by mass with respect to a total of 100 parts by mass of LCP 1 and LCP 2 (50 parts by mass for LCP 1 and 50 parts by mass for LCP 2).

Other than the above, the resin pellets 3 with a cylindrical shape (length 12 mm) were obtained in the same manner as in the manufacturing of the resin pellets 1 described above.

The length weighted average fiber length of the glass fibers in the resin pellets 3 was the same as the length of the pellets (12 mm).

The flow starting temperature of the resin pellets 3 was 305° C.

<<Manufacturing of Resin Pellets 4>>

LCP 3 described above was used as the neat pellets.

The resin structure 13 was obtained in which the fibrous filler (glass fiber) was 192 parts by mass with respect to 100 parts by mass of LCP 3.

Other than the above, resin pellets 4 (length 12 mm) with a cylindrical shape were obtained in the same manner as in the manufacturing of the resin pellets 1 described above.

The length weighted average fiber length of the glass fibers in the resin pellets 4 was the same as the length of the pellets (12 mm).

The flow starting temperature of the resin pellets 4 was 304° C.

The compositions of the resin pellets 1 to 4 are shown in Table 1.

TABLE 1

| | | | Resin pellets | | | |
|---|---|---|---|---|---|---|
| | | | Resin pellets 1 | Resin pellets 2 | Resin pellets 3 | Resin pellets 4 |
| First liquid crystal polyester resin | LCP1 | Parts by mass | 75 | 100 | 50 | |
| | LCP2 | Parts by mass | 25 | | 50 | |
| | LCP3 | Parts by mass | | | | 100 |
| Fibrous filler | Glass fibers (GF) | Parts by mass | 192 | 200 | 200 | 192 |

<Manufacturing of Molded Article (1)>

Examples 1 to 9, Comparative Examples 1 to 6

The liquid crystal polyester resin compositions of each example were produced by mixing the respective components shown in Tables 2 and 3 and the respective molded articles (injection-molded articles) were manufactured by a step of injection molding the liquid crystal polyester resin compositions. Specifically, each of the components shown in Tables 2 and 3 was mixed and introduced into the hopper of a TR450EH3 injection molding machine (manufactured by Sodick Co., Ltd.), respectively. At the melting and kneading temperature (plasticizing section) and plunger section temperature shown in Tables 2 to 3, melting and kneading and metering were performed in the injection molding machine and then multipurpose test pieces (Type A1) (thickness: 4 mm) were molded in accordance with JIS K7139 by injection at an injection speed of 20 mm/sec into a mold with a mold temperature of 100° C. The gate was a film gate with a thickness of 4 mm from the upper edge of a gripping section on one side of the multipurpose test piece.

Other injection conditions: temperature of the plunger section 360° C., screw rotation speed (plasticizing section) 100 rpm, back pressure 1 MPa, holding pressure 100 MPa, holding time 5 seconds Each of the abbreviations in Tables 2 and 3 have the following meanings.

Metal salt of higher fatty acids

S1: Calcium behenate (melting point: 130° C., manufactured by Nitto Chemical Industry Co., Ltd.)

S2: Magnesium behenate (melting point: 117° C., manufactured by Nitto Chemical Industry Co., Ltd.)

S3: Mixture of cyclic neopentane tetrayl bis (octadecylphosphite) and calcium stearate (melting point: 187° C.) (product name: PEP-8W, manufactured by Adeka Corporation)

S4: Lithium laurate (melting point: 234° C., manufactured by Nitto Chemical Industry Co., Ltd.)

External additives other than metal salt of higher fatty acids (other external additives)

A1: Erucic acid amide (melting point: 83° C., product name: Armoslip E, manufactured by Lion Specialty Chemicals Co., Ltd.)

A2: Polyamide 12 (melting point: 184° C., product name: VESTOSINT 2070 Natural, manufactured by Daicel-Evonik Ltd.)

The melting points of the metal salt of higher fatty acids and other external additives described above were measured using a differential scanning calorimeter (DSC-50, manufactured by Shimadzu Corporation). The position of the highest temperature side endothermic peak appearing when the temperature of the metal salt of higher fatty acid and the other external additives was raised at a rate of 10° C./min each was set as the melting point of the external additive.

For each of the molded articles (multipurpose test pieces (Type A1) (4 mm thick)) described above, measurement of the metering time, bending strength, and Charpy impact strength (with a notch) was performed as follows. The measurement results are shown in Tables 2 and 3.

[Measurement of Metering Time]

30 pieces of each of the molded articles (multipurpose test pieces (Type A1) (thickness: 4 mm)) described above were molded continuously and the metering time was measured for a total of 15 shots during molding from the 16th piece to the 30th piece. The average values are shown in Tables 2 and 3.

[Measurement of Bending Strength]

Each of the molded articles (multipurpose test pieces (Type A1) (thickness: 4 mm)) described above was cut to form a notch-less shape having a width of 10 mm, a length of 80 mm, and a thickness of 4 mm and five plate-shaped test pieces were obtained. Using the obtained five plate-shaped test pieces, the bending strength was measured five times in accordance with ISO 178. The average values are shown in Tables 2 and 3.

[Measurement of Charpy Impact Strength]

After cutting a plate-shaped test piece having a width of 10 mm, a length of 80 mm, and a thickness of 4 mm from each of the molded articles (multipurpose test pieces (type A1) (4 mm thick)), described above, a 450 V-shaped groove (notch tip radius: 0.25 mm±0.05 mm) with a depth of 2 mm was processed at the central section in the width direction of the plate-shaped test piece in accordance with ISO 2818 and JIS K7144 using a notching tool (model A-4, manufactured by Toyo Seiki Co., Ltd.) and ten notched plate-shaped test pieces were obtained. Using the obtained 10 notched plate-shaped test pieces, the Charpy impact strength was measured 10 times using a 7.5 J hammer in accordance with ISO 179-1 and JIS K7111-1. The average values are shown in Tables 2 and 3.

TABLE 2

| | | | Example 1 | Example 2 | Example 3 | Example 4 | Example 5 |
|---|---|---|---|---|---|---|---|
| Resin pellets | Resin pellets 1 (LCP1:LCP2:GF) | Parts by mass | 76 [19.5:6.5:50] | 76 [19.5:6.5:50] | 76 [19.5:6.5:50] | 76 [19.5:6.5:50] | 76 [19.5:6.5:50] |
| | Resin pellets 2 (LCP1:GF) | Parts by mass | | | | | |
| | Resin pellets 3 (LCP1:LCP2:GF) | Parts by mass | | | | | |
| Second liquid crystal polyester resin | LCP2 | Parts by mass | 24 | 24 | 24 | 24 | 24 |
| Metal salt of higher fatty acid | S1 | phr | 0.04 | 0.12 | | | 0.04 |
| | S2 | phr | | | 0.04 | 0.12 | |
| | S3 | phr | | | | | |
| | S4 | phr | | | | | |
| Melting and kneading temperature | Plasticizing section | ° C. | 300 | 300 | 300 | 300 | 300 |
| | Plunger section | ° C. | 360 | 360 | 360 | 360 | 360 |
| Flow starting temperature of resin pellets | | ° C. | 314 | 314 | 314 | 314 | 314 |
| Flow starting temperature of second liquid crystal polyester resin | | ° C. | 284 | 284 | 284 | 284 | 284 |
| Difference in flow starting temperature between resin pellets and second liquid crystal polyester resin | | ° C. | 30 | 30 | 30 | 30 | 30 |

TABLE 2-continued

| | | | | | | |
|---|---|---|---|---|---|---|
| Resin pellet length | mm | 9 | 9 | 9 | 9 | 12 |
| Metering time | s | 6.0 | 6.0 | 5.6 | 5.1 | 7.0 |
| Bending strength | MPa | 243 | 222 | 234 | 213 | 228 |
| Charpy impact strength (with a notch) | $kJ/m^2$ | 120 | 138 | 133 | 130 | 131 |

| | | Example 6 | Example 7 | Example 8 | Example 9 |
|---|---|---|---|---|---|
| Resin pellets | Resin pellets 1 (LCP1:LCP2:GF) | | | 76 [19.5:6.5:50] | 76 [19.5:6.5:50] |
| | Resin pellets 2 (LCP1:GF) | 75 [25:50] | | | |
| | Resin pellets 3 (LCP1:LCP2:GF) | | 75 [12.5:12.5:50] | | |
| Second liquid crystal polyester resin | LCP2 | 25 | 25 | 24 | 24 |
| Metal salt of higher fatty acid | S1 | 0.04 | 0.04 | | |
| | S2 | | | | |
| | S3 | | | 0.04 | |
| | S4 | | | | 0.12 |
| Melting and kneading temperature | Plasticizing section | 300 | 300 | 300 | 310 |
| | Plunger section | 360 | 360 | 360 | 360 |
| Flow starting temperature of resin pellets | | 321 | 305 | 314 | 314 |
| Flow starting temperature of second liquid crystal polyester resin | | 284 | 284 | 284 | 284 |
| Difference in flow starting temperature between resin pellets and second liquid crystal polyester resin | | 37 | 21 | 30 | 30 |
| Resin pellet length | | 12 | 12 | 9 | 9 |
| Metering time | | 8.2 | 9.3 | 9.9 | 5.5 |
| Bending strength | | 206 | 245 | 233 | 244 |
| Charpy impact strength (with a notch) | | 105 | 75 | 126 | 113 |

TABLE 3

| | | | Comparative Example 1 | Comparative Example 2 | Comparative Example 3 | Comparative Example 4 | Comparative Example 5 | Comparative Example 6 |
|---|---|---|---|---|---|---|---|---|
| Resin pellets | Resin pellets 1 (LCP1:LCP2:GF) | Parts by mass | 76 [19.5:6.5:50] | | 76 [19.5:6.5:50] | 76 [19.5:6.5:50] | 76 [19.5:6.5:50] | 76 [19.5:6.5:50] |
| | Resin pellets 4 (LCP3:GF) | Parts by mass | | 76 [26:50] | | | | |
| Second liquid crystal polyester resin | LCP1 | Parts by mass | 24 | | | | | |
| | LCP2 | Parts by mass | | | 24 | 24 | 24 | |
| | LCP4 | Parts by mass | | 24 | | | | |
| Other resins | PA | Parts by mass | | | | | | 24 |
| Metal salt of higher fatty acid | S1 | phr | | 0.04 | | | | 0.04 |
| | S2 | phr | 0.04 | | | | | |
| | S3 | phr | | | | | | |
| Other external additives | A1 | phr | | | | 0.04 | | |
| | A2 | phr | | | | | 0.12 | |
| Melting and kneading temperature | Plasticizing section | ° C. | 320 | 300 | 300 | 300 | 300 | 300 |
| | Plunger section | ° C. | 360 | 360 | 360 | 360 | 360 | 360 |
| Flow starting temperature of resin pellets | | ° C. | 314 | 304 | 314 | 314 | 314 | 314 |
| Flow starting temperature of second liquid crystal polyester resin | | ° C. | 315 | 294 | 284 | 284 | 284 | 226 |
| Difference in flow starting temperature between resin pellets and second liquid crystal polyester resin | | ° C. | −1 | 10 | 30 | 30 | 30 | 88 |
| Resin pellet length | | mm | 9 | 12 | 9 | 9 | 9 | 12 |
| Metering time | | s | 4.8 | 9.1 | 14.2 | — | 24.5 | 6.6 |
| Bending strength | | MPa | 199 | 212 | 215 | — | 194 | 290 |
| Charpy impact strength (with a notch) | | $kJ/m^2$ | 47 | 37 | 49 | — | 21 | 39 |

From the results shown in Tables 2 and 3, It is possible to confirm that the injection-molded articles produced using the liquid crystal polyester resin compositions of Examples 1 to 9 all have higher values for both bending strength and Charpy impact strength in comparison with the injection-molded articles produced using the resin compositions of Comparative Examples 1 to 6, both are achieved together, and the molded article strength is further increased.

For Comparative Examples 1 and 2, the difference in the flow starting temperatures between the resin pellets and the second liquid crystal polyester resin was small, thus it was not possible to maintain the fibrous filler included in the resin pellets in a bundled state and breakages of the fibrous filler progressed, therefore, the Charpy impact strength values were low.

Comparative Examples 3 and 5 did not contain metal salt of higher fatty acids, thus, the metering times were long, breakages occurred in the fibrous fillers, and the Charpy impact strength values were low.

In addition, due to screw over-torquing, it was not possible to mold Comparative Example 4, in which external additives other than metal salt of higher fatty acids were added.

Comparative Example 6 contained a resin that was not a liquid crystal polyester resin as the resin used in combination with the resin pellets, thus, the Charpy impact strength value was low.

Comparing Example 2 and Example 4 with Example 9, it is possible to confirm that the molded article strength (in particular, the Charpy impact strength) is improved in a case where metal salt of higher fatty acids (S1 and S2) with melting points of 230° C. or lower are used.

<Manufacturing of Resin Pellets (2)>

The resin pellets 5 and 6, in which the liquid crystal polyester resin was impregnated in carbon fibers, were each manufactured by the same method as in <Manufacturing of Resin Pellets (1)> described above, except that the fibrous filler was changed to the following carbon fibers.

Carbon fiber: "TR50S15L MB" manufactured by Mitsubishi Chemical Corporation; number-average fiber diameter of carbon fibers 7 μm, fiber convergence number 15,000 fibers, fineness 1000 g/1000 m.

<<Manufacturing of Resin Pellets 5>>

LCP 1 described above was used as neat pellets.

Using a die head with a nozzle diameter of 1.5 mm, the resin structure 13 was obtained in which the fibrous filler (carbon fiber) was 73 parts by mass with respect to 100 parts by mass of LCP 1.

Other than the above, resin pellets 5 (length 12 mm) with a cylindrical shape were obtained in the same manner as in the manufacturing of resin pellets 1 above.

The length weighted average fiber length of the carbon fibers in the resin pellets 5 was the same as the length of the pellets (12 mm).

The flow starting temperature of the resin pellets 5 was 319° C.

The length weighted average fiber length of the carbon fibers in the resin pellets was measured by the following method.

[Measurement of Length Weighted Average Fiber Length of Carbon Fibers in Resin Pellets]

The resin pellets 5 were cut in the longitudinal direction and the cross-section obtained by cutting was observed with a microscope. As a result of the observation, it was possible to confirm that the arrangement direction of the carbon fibers approximately matched the longitudinal direction of the resin pellets 5 and was approximately in parallel to the longitudinal direction of the resin pellets 5.

In addition, the length weighted average fiber length of the carbon fibers in the resin pellets 5 was determined by the following procedures.

Procedure (1); 2 g of resin pellets were heated at 500° C. for 3 hours in a muffle furnace to remove the resin content (first liquid crystal polyester resin).

Procedure (2); The resin content was removed from the resin pellets and the carbon fibers alone were dispersed in 1000 mL of an aqueous solution containing 0.05% by volume of a surfactant (Micro 90, manufactured by International Products Corporation) to prepare a carbon fiber dispersion solution.

Procedure (3); 100 mL was extracted from the carbon fiber dispersion solution and diluted to 10 times with pure water. 50 mL was extracted from the dispersion solution after dilution and filtered under reduced pressure using Kiriyama funnel filter paper (No. 5C) with a Φ90 mm diameter, the carbon fibers dispersed on the filter paper were observed with a microscope (VH-Z25, manufactured by Keyence Corporation, magnification 10 times), and 10 images were taken per sample such that the imaged regions did not overlap.

Procedure (4); The lengths of all the carbon fibers present in one taken image were measured with the measuring tool of the microscope. Here, bent carbon fibers were measured by multipoint-to-point measurement and fibers contacting the edge of the image were not measured. The same operation was performed sequentially with the 10 taken images until the total number of carbon fibers measured was more than 500 and the fiber length of the carbon fibers was measured.

Procedure (5); From the fiber lengths of the carbon fibers measured in Procedure (4), the length weighted average fiber length $lm=(\Sigma li^2 \times ni)/(\Sigma li \times ni)$ was determined ($\Sigma ni > 500$).

li: Fiber length of carbon fibers ni: Number of carbon fibers of fiber length li As a result, the length weighted average fiber length of the carbon fibers was the same as the length of the pellets (12 mm).

<<Manufacturing of Resin Pellets 6>>

LCP 3 described above was used as the neat pellets.

Using a die head with a nozzle diameter of 1.5 mm, the resin structure 13 was obtained in which the fibrous filler (carbon fiber) was 70 parts by mass with respect to 100 parts by mass of LCP 3.

Other than the above, resin pellets 6 (length 12 mm) with a cylindrical shape were obtained in the same manner as in the manufacturing of the resin pellets 1 above.

The length weighted average fiber length of the carbon fibers in the resin pellets 6 was the same as the length of the pellets (12 mm).

The flow starting temperature of the resin pellets 6 was 303° C.

The compositions of the resin pellets 5 and 6 are shown in Table 4.

TABLE 4

|  |  |  | Resin pellets | |
|---|---|---|---|---|
|  |  |  | Resin pellets 5 | Resin pellets 6 |
| First liquid crystal polyester resin | LCP1 | Parts by mass | 100 | |
|  | LCP3 | Parts by mass |  | 100 |
| Fibrous filler | Carbon fibers (CF) | Parts by mass | 73 | 70 |

<Manufacturing of Molded Article (2)>

Example 10, Comparative Example 7

The liquid crystal polyester resin compositions of Example 10 and Comparative Example 7 were produced by mixing each of the components shown in Table 4 and the respective molded articles (injection-molded articles) were manufactured by the step of injection molding the liquid crystal polyester resin compositions. Specifically, the same method as described in <Manufacturing of Molded article (1)> described above was used.

The abbreviations in Table 5 have the following meanings.

Metal salt of higher fatty acids

S1: Calcium behenate (melting point: 130° C., manufactured by Nitto Chemical Industry Co., Ltd.)

For each of the molded articles (multipurpose test pieces (Type A1) (4 mm thick)), measurement of the metering time and Charpy impact strength (with a notch) was performed by the same methods as described above respectively. The measurement results are shown in Table 5.

TABLE 5

|  |  |  | Example 10 | Comparative Example 7 |
|---|---|---|---|---|
| Resin pellets | Resin pellets 5 (LCP1:CF) | Parts by mass | 47.4 [27.4:20] |  |
|  | Resin pellets 6 (LCP3:CF) | Parts by mass |  | 48.4 [28.4:20] |
| Second liquid crystal polyester resin | LCP2 | Parts by mass | 52.6 |  |
|  | LCP4 | Parts by mass |  | 51.6 |
| Metal salt of higher fatty acid | S1 | phr | 0.04 | 0.04 |
| Melting and kneading temperature | Plasticizing section | ° C. | 300 | 300 |
|  | Plunger section | ° C. | 360 | 360 |
| Flow starting temperature of resin pellets |  | ° C. | 319 | 303 |
| Flow starting temperature of second liquid crystal polyester resin |  | ° C. | 284 | 294 |
| Difference in flow starting temperature between resin pellets and second liquid crystal polyester resin |  | ° C. | 35 | 9 |
| Resin pellet length |  | mm | 12 | 12 |
| Metering time |  | s | 11.3 | 11.8 |
| Charpy impact strength (with a notch) |  | kJ/m$^2$ | 34 | 17 |

From the results shown in Table 5, it is possible to confirm that the injection-molded article produced using the liquid crystal polyester resin composition of Example 10 has a higher Charpy impact strength value in comparison with the injection-molded article produced using the liquid crystal polyester resin composition of Comparative Example 7 and that the molded article strength is further improved.

For Comparative Example 7, the difference in the flow starting temperatures between the resin pellets and the second liquid crystal polyester resin was small, thus it was not possible to maintain the fibrous filler included in the resin pellets in a bundled state and breakages of the fibrous filler progressed, therefore, the Charpy impact strength value was low.

Although preferable Examples of the present invention were described above, the present invention is not limited to these Examples. Additions, omissions, substitutions, and other changes to the configurations are possible in a range not departing from the purpose of the present invention. The present invention is not limited by the above description, but only by the scope of the appended claims.

REFERENCE SIGNS LIST

100: Manufacturing apparatus
101 to 109: Transport rolls
120: Extruder
121: Pre-heating section
123: Impregnation section
125: Cooling section
127: Take-up section
129: Cutting section

The invention claimed is:

1. A liquid crystal polyester resin composition comprising:
   resin pellets including a first liquid crystal polyester resin and a fibrous filler;
   a second liquid crystal polyester resin; and
   a metal salt of fatty acid,
   wherein the second liquid crystal polyester resin has a lower flow beginning temperature than the resin pellets,
   wherein flow beginning temperatures of the resin pellets and the second liquid crystal polyester resin are both 250° C. or higher,
   wherein a difference in the flow beginning temperatures between the resin pellets and the second liquid crystal polyester resin is more than 10° C., and
   wherein a length weighted average fiber length of the fibrous filler in the resin pellets is 5 mm to 20 mm.

2. The liquid crystal polyester resin composition according to claim 1, wherein a melting point of the metal salt of fatty acid is 230° C. or lower.

3. The liquid crystal polyester resin composition according to claim 1, wherein a content of the fibrous filler is 20 parts by mass to 60 parts by mass with respect to 100 parts by mass of a total amount of the resin pellets and the second liquid crystal polyester resin.

4. The liquid crystal polyester resin composition according to claim 1, wherein a content of the metal salt of fatty acid is 0.02 parts by mass to 0.15 parts by mass with respect to 100 parts by mass of a total amount of the resin pellets and the second liquid crystal polyester resin.

5. The liquid crystal polyester resin composition according to claim 1, wherein the fibrous filler is glass fibers or carbon fibers.

6. A molded article produced from the liquid crystal polyester resin composition according to claim 1.

* * * * *